(12) United States Patent
Wheeler et al.

(10) Patent No.: US 12,408,757 B2
(45) Date of Patent: Sep. 9, 2025

(54) SHOOTING REST CHAIR

(71) Applicant: AOB Products Company, Columbia, MO (US)

(72) Inventors: Seth Wheeler, Columbia, MO (US); Timothy S. Kinney, Warrenton, MO (US); Ryan Varnum, Columbia, MO (US); Ryan Lovold, Columbia, MO (US); Aaron Wood, Columbia, MO (US); Michael Cottrell, Ashland, MO (US); Matthew Kinamore, Columbia, MO (US); James Tayon, Moberly, MO (US)

(73) Assignee: AOB Products Company, Columbia, MO (US)

(*) Notice: Subject to any disclaimer, the term of this patent is extended or adjusted under 35 U.S.C. 154(b) by 0 days.

(21) Appl. No.: 18/653,117

(22) Filed: May 2, 2024

(65) Prior Publication Data

US 2024/0277149 A1    Aug. 22, 2024

Related U.S. Application Data

(63) Continuation of application No. 17/659,222, filed on Apr. 14, 2022, now Pat. No. 12,004,658.
(Continued)

(51) Int. Cl.
*A01M 31/02*     (2006.01)
*A47C 3/18*      (2006.01)
(Continued)

(52) U.S. Cl.
CPC ............... *A47C 4/52* (2013.01); *A01M 31/02* (2013.01); *A47C 3/18* (2013.01); *A47C 4/44* (2013.01); *A47C 7/62* (2013.01)

(58) Field of Classification Search
CPC .......... F41A 23/02; A01M 31/02; A47C 3/18; A47C 4/44; A47C 4/52; A47C 9/10
See application file for complete search history.

(56) References Cited

U.S. PATENT DOCUMENTS

| 197,397 A | 11/1877 | O'Neil |
| 387,411 A | 8/1888 | Gisel |
| (Continued) | | |

FOREIGN PATENT DOCUMENTS

| CN | 107912904 A | 4/2018 |
| DE | 838872 | 5/1952 |
| (Continued) | | |

OTHER PUBLICATIONS

Joe's, "Shooter's Ridge Steady Point Shooting Rest," http://www.joessports.com/product/index.jsp?productId=3155005&cp=726872&parentPag..., Item No. 3155005, 1 pg. [Internet accessed Jul. 17, 2008].

(Continued)

*Primary Examiner* — Timothy J Brindley
(74) *Attorney, Agent, or Firm* — Stinson LLP

(57) ABSTRACT

A shooting rest chair, components thereof, and associated methods. The shooting rest chair includes a base configured to rest on a support surface. A seat supported by the base is sized and shaped to support a shooter when the shooter is sitting in the seat. A pivot hub is supported by the base and connects the base to the seat. A weapon support arm assembly connects to the pivot hub by a first pivot connection. The weapon support arm assembly is configured to support the weapon and is pivotable with respect to the base and the seat about the first pivot connection.

36 Claims, 8 Drawing Sheets

Related U.S. Application Data

(60) Provisional application No. 63/175,361, filed on Apr. 15, 2021.

(51) Int. Cl.
  *A47C 4/44* (2006.01)
  *A47C 4/52* (2006.01)
  *A47C 7/62* (2006.01)

(56) References Cited

U.S. PATENT DOCUMENTS

| | | | |
|---|---|---|---|
| 399,604 A | 3/1889 | Dufner et al. | |
| 499,315 A | 6/1893 | Borchardt | |
| 568,543 A | 9/1896 | Parks | |
| 668,219 A | 2/1901 | Rock | |
| 691,912 A | 1/1902 | McClean | |
| 718,865 A | 1/1903 | Northcraft | |
| 778,865 A | 1/1905 | Hyenga | |
| 789,909 A | 5/1905 | Herold | |
| 1,033,624 A | 7/1912 | Schmeisser | |
| 1,061,577 A | 5/1913 | Whitney | |
| 1,088,362 A | 2/1914 | Perkins | |
| 1,089,307 A | 3/1914 | Benet et al. | |
| 1,121,945 A | 12/1914 | Smith | |
| 1,145,585 A | 7/1915 | Hebard | |
| 1,175,692 A | 3/1916 | Boicourt | |
| 1,187,325 A | 6/1916 | Ivey | |
| 1,195,777 A | 8/1916 | Burtin | |
| 1,250,215 A | 12/1917 | Panos | |
| 1,256,255 A | 2/1918 | Porter | |
| 1,295,688 A | 2/1919 | Butler | |
| 1,367,353 A | 2/1921 | Craig | |
| 1,457,407 A | 6/1923 | Stokes | |
| 1,488,647 A | 4/1924 | Quinn | |
| 1,491,604 A | 4/1924 | Fuller | |
| 1,499,748 A | 7/1924 | Papouchis | |
| 1,639,722 A | 8/1927 | Whitney | |
| 1,693,289 A | 11/1928 | Warren | |
| 1,736,244 A | 11/1929 | Baker | |
| 1,902,040 A | 3/1933 | Meyer | |
| 1,907,181 A | 5/1933 | Fey | |
| 1,927,876 A | 9/1933 | Meyer | |
| 1,928,871 A | 10/1933 | Swebilius | |
| 1,938,345 A | 12/1933 | Monchiero et al. | |
| 2,066,218 A | 12/1936 | Morgan | |
| 2,079,510 A | 5/1937 | King et al. | |
| 2,090,930 A | 8/1937 | Chubb | |
| 2,100,514 A | 11/1937 | Miller | |
| 2,121,982 A | 6/1938 | Pugsley | |
| 2,125,353 A | 8/1938 | Mattson | |
| 2,216,766 A | 10/1940 | Cook | |
| 2,228,179 A | 1/1941 | Motley | |
| 2,232,743 A | 2/1941 | Swenson | |
| 2,297,993 A | 10/1942 | Tratsch | |
| 2,331,372 A | 10/1943 | Buchanan | |
| 2,378,545 A | 6/1945 | Fraser et al. | |
| D147,305 S | 8/1947 | Sloan | |
| 2,427,365 A | 9/1947 | Meister | |
| 2,432,519 A | 12/1947 | Garand | |
| 2,451,266 A | 10/1948 | Whittemore | |
| 2,455,644 A | 12/1948 | Barnes | |
| 2,476,078 A | 7/1949 | Banks | |
| 2,479,354 A | 8/1949 | Hanson | |
| 2,483,089 A | 9/1949 | Ferguson | |
| 2,484,801 A | 10/1949 | Anderson | |
| 2,508,951 A | 5/1950 | Kazimier | |
| 2,510,380 A | 6/1950 | Clifford | |
| 2,517,268 A | 8/1950 | Wilson | |
| 2,572,585 A | 10/1951 | Barber | |
| 2,582,140 A | 1/1952 | Leek | |
| 2,638,676 A | 5/1953 | Callahan | |
| 2,677,207 A | 5/1954 | Stewart | |
| 2,701,009 A * | 2/1955 | Richard | A47C 9/10 297/440.16 |
| 2,701,930 A | 2/1955 | Dolan | |
| 2,729,276 A * | 1/1956 | Volney | A47C 4/52 297/34 |
| 2,729,975 A | 1/1956 | Hawthornet et al. | |
| 2,731,829 A | 1/1956 | Wigington et al. | |
| 2,740,530 A | 4/1956 | Ponder | |
| 2,753,642 A | 7/1956 | Sullivan | |
| 2,774,090 A | 12/1956 | Allinson | |
| 2,774,563 A | 12/1956 | Pribis | |
| 2,795,881 A | 6/1957 | Bellows | |
| 2,813,376 A | 11/1957 | Middlemark | |
| 2,817,233 A | 12/1957 | Dower et al. | |
| 2,821,117 A | 1/1958 | Hultgren | |
| 2,847,909 A | 8/1958 | Kester | |
| 2,867,931 A | 1/1959 | Schreiber | |
| 2,874,707 A | 2/1959 | Koppel | |
| 2,877,689 A | 3/1959 | Pribis | |
| 2,894,347 A | 7/1959 | Woodcock | |
| 2,924,881 A | 2/1960 | Gee | |
| 2,924,904 A | 2/1960 | Amsler | |
| 2,924,914 A | 2/1960 | Garwood | |
| 2,973,803 A | 3/1961 | Mickelson | |
| 2,975,540 A | 3/1961 | Lewis | |
| 2,999,788 A | 9/1961 | Morgan | |
| 3,011,283 A | 12/1961 | Lunn et al. | |
| 3,012,350 A | 12/1961 | Wold | |
| 3,013,289 A | 12/1961 | Sasena | |
| 3,023,527 A | 3/1962 | Leek et al. | |
| 3,024,653 A | 3/1962 | Broadway | |
| 3,041,938 A | 7/1962 | Seabrook | |
| 3,055,655 A | 9/1962 | Chelf | |
| 3,060,612 A | 10/1962 | Brown et al. | |
| 3,064,976 A | 11/1962 | Kuhn | |
| 3,107,642 A | 10/1963 | Lakin | |
| 3,112,567 A | 12/1963 | Flanagan | |
| 3,125,929 A | 3/1964 | Peasley | |
| 3,128,668 A | 4/1964 | Dicken | |
| 3,137,957 A | 6/1964 | Ingalls | |
| 3,163,420 A | 12/1964 | Braun | |
| 3,175,456 A | 3/1965 | Goodsell | |
| 3,183,617 A | 5/1965 | Ruger et al. | |
| 3,205,518 A | 9/1965 | Romaine | |
| 3,206,885 A | 9/1965 | Dye | |
| 3,225,656 A | 12/1965 | Flaherty et al. | |
| D203,680 S | 2/1966 | Allison | |
| 3,240,103 A | 3/1966 | Lamont | |
| 3,259,986 A | 7/1966 | Carr | |
| 3,283,425 A | 11/1966 | Boyd | |
| 3,283,643 A | 11/1966 | Mittelsteadt | |
| 3,291,317 A | 12/1966 | Bowen | |
| 3,292,293 A | 12/1966 | Chiasera et al. | |
| 3,320,848 A | 5/1967 | Ponsness | |
| 3,323,246 A | 6/1967 | Loffler | |
| 3,327,422 A | 6/1967 | Harris | |
| 3,330,561 A | 7/1967 | Kandel | |
| 3,343,411 A | 9/1967 | Lee | |
| 3,349,728 A | 10/1967 | Barecki et al. | |
| 3,353,827 A | 11/1967 | Dun, Jr. | |
| 3,358,504 A | 12/1967 | Freebairn | |
| 3,370,852 A | 2/1968 | Kandel | |
| 3,406,969 A | 10/1968 | Tisdell et al. | |
| 3,423,092 A | 1/1969 | Kandel | |
| D215,311 S | 9/1969 | Born | |
| 3,473,673 A | 10/1969 | Porter | |
| 3,474,743 A | 10/1969 | Blevins | |
| 3,486,752 A | 12/1969 | Colvin | |
| 3,499,525 A | 3/1970 | Kanter | |
| 3,510,951 A | 5/1970 | Dow | |
| 3,513,604 A | 5/1970 | Matsunaga et al. | |
| 3,536,160 A | 10/1970 | Brewer | |
| 3,550,941 A | 12/1970 | Spiro et al. | |
| 3,556,666 A | 1/1971 | Lichenstern | |
| D220,154 S | 3/1971 | Irelan | |
| 3,572,712 A | 3/1971 | Vick | |
| 3,580,127 A | 5/1971 | Lee | |
| 3,583,556 A | 6/1971 | Wagner | |
| 3,584,820 A | 6/1971 | Butcher, Sr. | |
| 3,587,193 A | 6/1971 | Lewis | |
| 3,608,225 A | 9/1971 | Manuel | |
| 3,609,902 A | 10/1971 | Casull | |

(56) References Cited

U.S. PATENT DOCUMENTS

| | | |
|---|---|---|
| 3,646,704 A | 3/1972 | Ellsworth |
| 3,648,909 A | 3/1972 | Wisecarver |
| 3,680,266 A | 8/1972 | Shiplov |
| 3,680,354 A | 8/1972 | Phillips, Jr. |
| 3,685,194 A | 8/1972 | Coon |
| 3,711,955 A | 1/1973 | Holt |
| 3,711,984 A | 1/1973 | Dyer et al. |
| 3,736,243 A | 5/1973 | Duggan |
| 3,738,101 A | 6/1973 | Simon-Vermot |
| 3,739,515 A | 6/1973 | Koon, Jr. |
| 3,743,088 A | 7/1973 | Henkin |
| 3,744,292 A | 7/1973 | Michelson |
| 3,745,875 A | 7/1973 | Kennedy et al. |
| 3,748,950 A | 7/1973 | Huntington |
| 3,764,219 A | 10/1973 | Collins |
| 3,769,758 A | 11/1973 | McDonald |
| 3,771,176 A | 11/1973 | Herman, Sr. |
| 3,804,238 A | 4/1974 | Howard |
| 3,813,816 A | 6/1974 | Funk |
| 3,815,270 A | 6/1974 | Pachmayr |
| 3,826,559 A | 7/1974 | Berliner et al. |
| 3,827,172 A | 8/1974 | Howe |
| 3,842,527 A | 10/1974 | Low |
| D233,853 S | 12/1974 | Ferrara |
| 3,876,078 A | 4/1975 | Gomes et al. |
| 3,877,178 A | 4/1975 | Campanelli |
| 3,878,939 A | 4/1975 | Wilcox |
| 3,885,357 A | 5/1975 | Hoyt |
| 3,893,266 A | 7/1975 | Anderson et al. |
| 3,895,803 A | 7/1975 | Loe |
| 3,899,175 A | 8/1975 | Loe |
| 3,899,797 A | 8/1975 | Gunst |
| D237,106 S | 10/1975 | Baljet et al. |
| 3,913,746 A | 10/1975 | Burton |
| 3,914,879 A | 10/1975 | Taylor, III et al. |
| 3,935,657 A | 2/1976 | Wade |
| 3,947,988 A | 4/1976 | Besaw |
| 3,949,987 A | 4/1976 | Candor |
| 3,961,436 A | 6/1976 | Hagen et al. |
| 3,964,613 A | 6/1976 | Anderson, Jr. |
| 3,979,849 A | 9/1976 | Haskins |
| 4,007,554 A | 2/1977 | Helmstadter |
| 4,012,860 A | 3/1977 | Auger |
| 4,018,339 A | 4/1977 | Pritz |
| 4,021,971 A | 5/1977 | McFadden |
| 4,026,057 A | 5/1977 | Cady |
| 4,027,781 A | 6/1977 | Covert |
| 4,042,242 A | 8/1977 | Nicholls et al. |
| 4,054,288 A | 10/1977 | Perrine, Sr. |
| 4,055,016 A | 10/1977 | Katsenes |
| 4,072,313 A | 2/1978 | Murso et al. |
| 4,076,247 A | 2/1978 | Kim et al. |
| 4,090,606 A | 5/1978 | Dawson |
| 4,120,108 A | 10/1978 | Vickers et al. |
| 4,120,276 A | 10/1978 | Curran |
| 4,122,623 A | 10/1978 | Stice |
| 4,143,491 A | 3/1979 | Blanc |
| 4,177,608 A | 12/1979 | Balz |
| 4,188,855 A | 2/1980 | Alberts |
| 4,203,600 A | 5/1980 | Brown |
| 4,206,573 A | 6/1980 | Hayward |
| 4,207,699 A | 6/1980 | Hensley |
| 4,222,305 A | 9/1980 | Lee |
| 4,223,588 A | 9/1980 | Simpson |
| 4,233,748 A | 11/1980 | Ford et al. |
| D257,687 S | 12/1980 | Bechtel |
| 4,265,045 A | 5/1981 | Garbini |
| 4,266,748 A | 5/1981 | Dalton |
| 4,266,780 A | 5/1981 | McQuary |
| 4,282,671 A | 8/1981 | Wood et al. |
| D260,650 S | 9/1981 | Alviti |
| 4,296,963 A | 10/1981 | Blanchard et al. |
| D261,794 S | 11/1981 | Bechtel |
| 4,301,625 A | 11/1981 | Rampe |
| 4,312,146 A | 1/1982 | Koon, Jr. et al. |
| 4,332,185 A | 6/1982 | Hargrove |
| 4,333,385 A | 6/1982 | Culver |
| 4,338,726 A | 7/1982 | Swailes |
| 4,340,370 A | 7/1982 | Marshall et al. |
| 4,345,398 A | 8/1982 | Pickett |
| 4,346,530 A | 8/1982 | Stewart et al. |
| 4,359,833 A | 11/1982 | Pachmayr et al. |
| 4,361,989 A | 12/1982 | Ohno |
| 4,385,464 A | 5/1983 | Casull |
| 4,385,545 A | 5/1983 | Duer |
| 4,391,058 A | 7/1983 | Casull |
| 4,392,321 A | 7/1983 | Bosworth |
| 4,407,379 A | 10/1983 | Pryor et al. |
| 4,409,751 A | 10/1983 | Goda et al. |
| 4,409,826 A | 10/1983 | Wenger |
| 4,426,085 A | 1/1984 | Dixon |
| 4,438,581 A | 3/1984 | LaValle |
| 4,438,913 A | 3/1984 | Hylla |
| 4,446,900 A | 5/1984 | Markovich |
| 4,449,314 A | 5/1984 | Sorensen |
| 4,462,598 A | 7/1984 | Chalin et al. |
| 4,477,082 A | 10/1984 | McKenzie et al. |
| 4,480,411 A | 11/1984 | Blaz et al. |
| 4,501,071 A | 2/1985 | Manske |
| 4,506,466 A | 3/1985 | Hall |
| 4,508,508 A | 4/1985 | Theodore |
| 4,512,101 A | 4/1985 | Waterman, Jr. |
| 4,522,102 A | 6/1985 | Pickens |
| 4,526,084 A | 7/1985 | David et al. |
| 4,535,559 A | 8/1985 | Hall |
| 4,540,182 A | 9/1985 | Clement |
| 4,542,677 A | 9/1985 | Lee |
| 4,545,144 A | 10/1985 | Schuster |
| 4,548,392 A | 10/1985 | Rickling |
| 4,558,531 A | 12/1985 | Kilby |
| 4,565,403 A | 1/1986 | Brown |
| D283,561 S | 4/1986 | Geist et al. |
| 4,601,124 A | 7/1986 | Brown, Jr. |
| 4,608,762 A | 9/1986 | Varner |
| 4,621,563 A | 11/1986 | Poiencot |
| 4,625,620 A | 12/1986 | Harris |
| 4,632,008 A | 12/1986 | Homer |
| 4,644,987 A | 2/1987 | Kiang et al. |
| 4,645,167 A * | 2/1987 | Hardwick ............... B63B 29/04 248/283.1 |
| 4,648,191 A | 3/1987 | Goff et al. |
| 4,653,210 A | 3/1987 | Poff, Jr. |
| 4,671,364 A | 6/1987 | Fink et al. |
| 4,674,216 A | 6/1987 | Ruger et al. |
| 4,695,060 A | 9/1987 | Pilgrim |
| 4,696,356 A | 9/1987 | Ellion et al. |
| 4,702,029 A | 10/1987 | Shaine |
| 4,715,476 A | 12/1987 | France |
| 4,715,499 A | 12/1987 | Franklin |
| 4,716,673 A | 1/1988 | Williams et al. |
| 4,721,205 A | 1/1988 | Burt et al. |
| 4,723,472 A | 2/1988 | Lee |
| 4,729,186 A | 3/1988 | Rieger |
| 4,732,394 A | 3/1988 | Stein et al. |
| 4,736,843 A | 4/1988 | Leonard |
| 4,739,996 A | 4/1988 | Vedder |
| 4,751,963 A | 6/1988 | Bui et al. |
| D297,855 S | 9/1988 | Ruger et al. |
| 4,776,471 A | 10/1988 | Elkins |
| 4,790,079 A | 12/1988 | Meyers |
| 4,790,096 A | 12/1988 | Gibson et al. |
| 4,798,411 A | 1/1989 | Lin |
| 4,799,324 A | 1/1989 | Nodo |
| 4,807,381 A | 2/1989 | Southard |
| 4,807,888 A | 2/1989 | Pidde et al. |
| 4,815,593 A | 3/1989 | Brown |
| 4,819,359 A | 4/1989 | Bassett |
| 4,821,256 A | 4/1989 | Schmidt |
| 4,821,422 A | 4/1989 | Porter |
| 4,821,443 A | 4/1989 | Bianco et al. |
| 4,823,673 A | 4/1989 | Downing |
| 4,824,086 A | 4/1989 | Rickling, deceased et al. |
| 4,841,839 A | 6/1989 | Stuart |
| 4,850,151 A | 7/1989 | Ditscherlein |

(56) References Cited

U.S. PATENT DOCUMENTS

| | | |
|---|---|---|
| 4,854,066 A | 8/1989 | Canterbury, Sr. |
| 4,862,567 A | 9/1989 | Beebe |
| D304,223 S | 10/1989 | Ruger et al. |
| 4,873,777 A | 10/1989 | Southard |
| 4,877,131 A | 10/1989 | Patros et al. |
| 4,890,406 A | 1/1990 | French |
| 4,890,847 A | 1/1990 | Cartee et al. |
| 4,896,446 A | 1/1990 | Gregory |
| D306,234 S | 2/1990 | Ferstl et al. |
| 4,903,425 A | 2/1990 | Harris |
| 4,910,904 A | 3/1990 | Rose |
| 4,918,825 A | 4/1990 | Lesh et al. |
| 4,923,402 A | 5/1990 | Marshall et al. |
| 4,924,616 A | 5/1990 | Bell |
| 4,937,965 A | 7/1990 | Narvaez |
| D310,302 S | 9/1990 | Southard |
| 4,967,497 A | 11/1990 | Yakscoe |
| 4,971,208 A | 11/1990 | Reinfried, Jr. et al. |
| 4,972,619 A | 11/1990 | Eckert |
| 4,979,752 A | 12/1990 | Fosseen |
| D313,886 S | 1/1991 | Southard |
| 4,987,694 A | 1/1991 | Lombardo |
| 4,998,367 A | 3/1991 | Leibowitz |
| 4,998,944 A | 3/1991 | Lund |
| 5,005,657 A | 4/1991 | Ellion et al. |
| 5,009,021 A | 4/1991 | Nelson |
| 5,014,793 A | 5/1991 | Germanton et al. |
| 5,031,348 A | 7/1991 | Carey |
| 5,050,330 A | 9/1991 | Pilgrim et al. |
| 5,058,302 A | 10/1991 | Minneman |
| 5,060,410 A | 10/1991 | Mueller |
| 5,063,679 A | 11/1991 | Schwandt |
| 5,067,268 A | 11/1991 | Ransom |
| 5,070,636 A | 12/1991 | Mueller |
| 5,074,188 A | 12/1991 | Harris |
| 5,081,783 A | 1/1992 | Jarvis |
| 5,117,850 A | 6/1992 | Money |
| 5,123,194 A | 6/1992 | Mason |
| 5,125,389 A | 6/1992 | Paff |
| 5,143,340 A | 9/1992 | Wood et al. |
| 5,149,900 A | 9/1992 | Buck |
| 5,173,563 A | 12/1992 | Gray |
| 5,180,874 A | 1/1993 | Troncoso, Jr. |
| 5,185,927 A | 2/1993 | Rivers |
| 5,186,468 A | 2/1993 | Davies |
| 5,188,371 A | 2/1993 | Edwards |
| 5,194,678 A | 3/1993 | Kramer |
| D335,896 S | 5/1993 | Evenson |
| 5,211,404 A | 5/1993 | Grant |
| 5,221,806 A | 6/1993 | Chaney et al. |
| 5,222,306 A | 6/1993 | Neumann |
| 5,228,887 A | 7/1993 | Mayer et al. |
| 5,232,227 A | 8/1993 | Bateman |
| 5,233,779 A | 8/1993 | Shaw |
| 5,235,764 A | 8/1993 | Perazzi |
| 5,237,778 A | 8/1993 | Baer |
| 5,240,258 A | 8/1993 | Bateman |
| 5,247,758 A | 9/1993 | Mason |
| 5,271,175 A | 12/1993 | West, III |
| 5,275,890 A | 1/1994 | Wolf et al. |
| 5,287,643 A | 2/1994 | Arizpe-Gilmore |
| 5,311,693 A | 5/1994 | Underwood |
| 5,315,781 A | 5/1994 | Beisner |
| 5,316,579 A | 5/1994 | McMillan et al. |
| 5,320,217 A | 6/1994 | Lenarz |
| 5,320,223 A | 6/1994 | Allen |
| 5,328,029 A | 7/1994 | Chow et al. |
| 5,332,185 A | 7/1994 | Walker, III |
| 5,333,829 A | 8/1994 | Bell et al. |
| 5,335,578 A | 8/1994 | Lorden et al. |
| 5,337,505 A | 8/1994 | Brown et al. |
| 5,344,012 A | 9/1994 | Matthews |
| 5,347,740 A | 9/1994 | Rather et al. |
| 5,351,428 A | 10/1994 | Graham |
| 5,354,247 A | 10/1994 | Wilkinson |
| 5,358,254 A | 10/1994 | Yeh et al. |
| 5,361,505 A | 11/1994 | Faughn |
| 5,367,232 A | 11/1994 | Netherton et al. |
| 5,370,240 A | 12/1994 | Hand |
| 5,375,337 A | 12/1994 | Butler |
| 5,375,377 A | 12/1994 | Kenton |
| 5,392,553 A | 2/1995 | Carey |
| 5,394,983 A | 3/1995 | Latulippe et al. |
| 5,402,595 A | 4/1995 | Tamllos |
| 5,406,733 A | 4/1995 | Tarlton et al. |
| 5,410,833 A | 5/1995 | Paterson |
| 5,414,949 A | 5/1995 | Peebles |
| D359,392 S | 6/1995 | Bellington |
| 5,421,115 A | 6/1995 | McKay |
| 5,433,010 A | 7/1995 | Bell |
| 5,433,451 A | 7/1995 | DeVries |
| 5,435,223 A | 7/1995 | Blodgett et al. |
| 5,442,860 A | 8/1995 | Palmer |
| D362,116 S | 9/1995 | Bellington et al. |
| 5,446,987 A | 9/1995 | Lee et al. |
| D364,080 S | 11/1995 | Weyrauch |
| 5,481,817 A | 1/1996 | Parker |
| 5,482,241 A | 1/1996 | Oglesby |
| 5,486,135 A | 1/1996 | Arpaio |
| 5,490,302 A | 2/1996 | Dion |
| 5,491,921 A | 2/1996 | Allen |
| 5,497,557 A | 3/1996 | Martinsson et al. |
| 5,497,575 A | 3/1996 | Fried et al. |
| 5,501,467 S | 3/1996 | Kandel |
| D369,904 S | 5/1996 | Taylor |
| 5,525,314 A | 6/1996 | Hurson |
| 5,540,329 A | 7/1996 | Vogeley |
| 5,545,855 A | 8/1996 | Stanfield et al. |
| 5,562,208 A | 10/1996 | Hasler et al. |
| D375,538 S | 11/1996 | Minneman |
| 5,570,513 A | 11/1996 | Peterson |
| 5,580,063 A | 12/1996 | Edwards |
| 5,588,242 A | 12/1996 | Hughes |
| D377,823 S | 2/1997 | Rainwater |
| 5,600,913 A | 2/1997 | Minneman |
| 5,617,666 A | 4/1997 | Scott |
| 5,622,344 A | 4/1997 | Gracie |
| 5,628,135 A | 5/1997 | Cady |
| D380,116 S | 6/1997 | Minneman |
| 5,640,944 A | 6/1997 | Minneman |
| 5,644,862 A | 7/1997 | Folmer |
| 5,649,465 A | 7/1997 | Beebe |
| 5,651,207 A | 7/1997 | Knight |
| 5,653,625 A | 8/1997 | Pierce et al. |
| 5,661,919 A | 9/1997 | Pryor |
| 5,662,516 A | 9/1997 | You |
| 5,666,757 A | 9/1997 | Helmstadter |
| 5,688,024 A * | 11/1997 | Arizpe-Gilmore ... A01M 31/02 297/440.1 |
| D387,123 S | 12/1997 | Hughes et al. |
| 5,697,180 A | 12/1997 | Morizio |
| 5,703,317 A | 12/1997 | Levilly et al. |
| 5,704,482 A | 1/1998 | Apps et al. |
| 5,711,102 A | 1/1998 | Plaster et al. |
| 5,711,103 A | 1/1998 | Keng |
| 5,715,624 A | 2/1998 | Hilbelink et al. |
| 5,715,625 A | 2/1998 | West, III |
| D391,616 S | 3/1998 | Plybon |
| 5,723,183 A | 3/1998 | Williams et al. |
| 5,723,806 A | 3/1998 | Odom |
| 5,725,096 A | 3/1998 | Winnard |
| 5,737,865 A | 4/1998 | Brandl et al. |
| 5,740,625 A | 4/1998 | Jenkins |
| 5,743,395 A | 4/1998 | Backer |
| 5,758,447 A | 6/1998 | Venetz |
| 5,758,933 A | 6/1998 | Clendening |
| 5,761,954 A | 6/1998 | Dvorak |
| 5,778,589 A | 7/1998 | Teague |
| 5,779,527 A | 7/1998 | Maebashi |
| 5,791,499 A | 8/1998 | Zebbedies |
| 5,811,720 A | 9/1998 | Quinnell et al. |
| 5,815,974 A | 10/1998 | Keng |
| 5,833,308 A | 11/1998 | Strong, III et al. |
| D403,176 S | 12/1998 | Harper |

(56) References Cited

U.S. PATENT DOCUMENTS

| | | |
|---|---|---|
| 5,845,774 A | 12/1998 | Hausknecht |
| 5,857,279 A | 1/1999 | de Oliveira Masina et al. |
| 5,875,580 A | 3/1999 | Hill et al. |
| 5,878,504 A | 3/1999 | Harms |
| 5,884,966 A | 3/1999 | Hill et al. |
| 5,899,329 A | 5/1999 | Hu et al. |
| 5,907,919 A | 6/1999 | Keeney |
| 5,913,131 A | 6/1999 | Hossain et al. |
| 5,913,422 A | 6/1999 | Cote et al. |
| 5,913,667 A | 6/1999 | Smilee |
| 5,913,668 A | 6/1999 | Messer |
| 5,924,694 A | 7/1999 | Kent |
| 5,930,932 A | 8/1999 | Peterson |
| 5,933,997 A | 8/1999 | Barrett |
| 5,933,999 A | 8/1999 | McClure et al. |
| 5,937,561 A | 8/1999 | Abernethy |
| 5,959,613 A | 9/1999 | Rosenbreg et al. |
| 5,970,642 A | 10/1999 | Martin |
| 5,974,719 A | 11/1999 | Simonek |
| 6,019,375 A | 2/2000 | West, Jr. |
| 6,021,891 A | 2/2000 | Anderson |
| 6,032,796 A | 3/2000 | Hopper et al. |
| 6,042,080 A | 3/2000 | Shepherd et al. |
| 6,044,747 A | 4/2000 | Felts |
| 6,058,641 A | 5/2000 | Vecqueray |
| 6,073,381 A | 6/2000 | Farrar et al. |
| 6,086,375 A | 7/2000 | Legros |
| 6,092,662 A | 7/2000 | Frederick, Jr. et al. |
| 6,110,020 A | 8/2000 | Rolfi |
| 6,121,556 A | 9/2000 | Cole |
| 6,237,462 B1 | 5/2001 | hawkes et al. |
| 6,253,482 B1 | 7/2001 | Peterson |
| 6,254,100 B1 | 7/2001 | Rinehart |
| 6,260,463 B1 | 7/2001 | Brand et al. |
| 6,269,578 B1 | 8/2001 | Callegari |
| 6,283,428 B1 | 9/2001 | Maples et al. |
| 6,289,622 B1 | 9/2001 | Desch, Jr. et al. |
| 6,293,041 B2 | 9/2001 | Weaver |
| 6,294,759 B1 | 9/2001 | Dunn, Jr. |
| 6,305,117 B1 | 10/2001 | Hales, Sr. |
| 6,309,476 B1 | 10/2001 | Ravenscroft et al. |
| 6,338,218 B1 | 1/2002 | Hegler |
| 6,347,831 B1 | 2/2002 | Nye et al. |
| 6,390,294 B1 | 5/2002 | Fiore et al. |
| 6,397,720 B1 | 6/2002 | Fox et al. |
| 6,439,515 B1 | 8/2002 | Powers |
| 6,439,530 B1 | 8/2002 | Shoenfish et al. |
| 6,517,133 B2 | 2/2003 | Seegmiller et al. |
| D471,248 S | 3/2003 | Jacobs |
| 6,526,687 B1 | 3/2003 | Looney |
| D473,376 S | 4/2003 | Abate |
| 6,539,660 B1 | 4/2003 | Yeargin |
| 6,546,662 B1 | 4/2003 | Chong |
| 6,557,855 B2 | 5/2003 | Wu |
| 6,574,899 B1 | 6/2003 | Mostello |
| 6,575,469 B2 | 6/2003 | Lowe |
| 6,637,708 B1* | 10/2003 | Peterson ............... A01M 31/02 |
| | | 182/187 |
| 6,643,973 B1 | 11/2003 | Smith |
| 6,663,298 B2 | 12/2003 | Haney |
| 6,688,031 B2 | 2/2004 | Steele |
| 6,698,830 B1 | 3/2004 | Gaines |
| 6,733,375 B2 | 5/2004 | Hoffman |
| 6,736,400 B1 | 5/2004 | Cesternino |
| 6,813,855 B2 | 11/2004 | Pinkley |
| 6,814,654 B2 | 11/2004 | Rolfi |
| 6,854,975 B2 | 2/2005 | Ranzinger |
| 6,860,054 B1 | 3/2005 | Mosher |
| 6,860,055 B1 | 3/2005 | Walrath |
| 6,862,833 B1 | 3/2005 | Gutner |
| 6,871,440 B2 | 3/2005 | Highfill et al. |
| 6,877,266 B1 | 4/2005 | Brownlee |
| 6,883,263 B1 | 4/2005 | Carrow |
| 6,895,709 B1 | 5/2005 | Krien et al. |
| 6,931,777 B1 | 8/2005 | Krien |
| 6,935,064 B1* | 8/2005 | Thompson ............... F41A 23/34 |
| | | 248/370 |
| 6,953,114 B2 | 10/2005 | Wang et al. |
| D513,055 S | 12/2005 | Lahti |
| 6,978,569 B2 | 12/2005 | Williamson, IV et al. |
| D519,183 S | 4/2006 | Minneman |
| 7,032,494 B2 | 4/2006 | Wygant |
| 7,032,965 B2* | 4/2006 | Howell ............... A01M 31/02 |
| | | 297/344.21 |
| D521,100 S | 5/2006 | Morrow |
| 7,043,862 B2 | 5/2006 | Franks |
| D522,263 S | 6/2006 | Hart |
| 7,055,279 B2 | 6/2006 | Flores |
| 7,059,670 B2 | 6/2006 | Mills et al. |
| 7,062,979 B2 | 6/2006 | Day et al. |
| D524,541 S | 7/2006 | Cauley |
| 7,086,192 B1 | 8/2006 | Deros |
| 7,104,398 B1 | 9/2006 | Wisecarver |
| 7,134,663 B1 | 11/2006 | Lowe et al. |
| 7,143,986 B1 | 12/2006 | Austin et al. |
| 7,152,355 B2 | 12/2006 | Fitzpatrick et al. |
| 7,152,358 B1* | 12/2006 | LeAnna ............... F41A 23/02 |
| | | 297/170 |
| 7,159,711 B1 | 1/2007 | Gardner |
| 7,165,750 B2 | 1/2007 | McCuskey et al. |
| 7,188,445 B2 | 3/2007 | Lehman |
| D540,904 S | 4/2007 | Werner |
| 7,200,966 B2 | 4/2007 | Gooder |
| 7,201,376 B2 | 4/2007 | Kuosa |
| 7,207,567 B1 | 4/2007 | Brown |
| D543,604 S | 5/2007 | Minneman |
| 7,213,494 B2 | 5/2007 | James |
| 7,216,404 B1 | 5/2007 | Doyle |
| 7,222,451 B2 | 5/2007 | Keng et al. |
| 7,225,050 B2 | 5/2007 | Sutula, Jr. |
| 7,246,704 B2 | 7/2007 | Brunson et al. |
| 7,258,345 B2 | 8/2007 | Anderson, Jr. |
| D553,219 S | 10/2007 | Potterfield |
| 7,281,346 B1 | 10/2007 | Cook et al. |
| 7,281,347 B2 | 10/2007 | Carpenter |
| 7,314,248 B2 | 1/2008 | Mabon et al. |
| D567,895 S | 4/2008 | Cauley |
| 7,356,960 B1 | 4/2008 | Knitt |
| 7,356,961 B2 | 4/2008 | Williams |
| 7,357,250 B2 | 4/2008 | Hagemann |
| 7,363,740 B2 | 4/2008 | Kincel |
| 7,367,451 B2 | 5/2008 | Pendergraph et al. |
| 7,401,431 B2 | 7/2008 | Pierce et al. |
| 7,410,053 B2 | 8/2008 | Bowen et al. |
| D576,245 S | 9/2008 | Potterfield et al. |
| 7,421,815 B1 | 9/2008 | Moody et al. |
| 7,426,800 B2 | 9/2008 | Pierce et al. |
| 7,431,247 B2 | 10/2008 | Bobro |
| 7,438,356 B2 | 10/2008 | Howman et al. |
| 7,481,015 B2 | 1/2009 | Mays |
| 7,536,819 B2 | 5/2009 | Popikow |
| 7,536,820 B2 | 5/2009 | Wade et al. |
| 7,549,247 B1 | 6/2009 | Reese |
| 7,584,690 B2 | 9/2009 | Cauley |
| D605,246 S | 12/2009 | Hobbs |
| 7,631,455 B2 | 12/2009 | Keng et al. |
| 7,631,877 B2 | 12/2009 | Zara |
| 7,644,981 B2 | 1/2010 | Hensley |
| 7,654,498 B1 | 2/2010 | Beltz |
| 7,658,140 B2 | 2/2010 | Lombardi |
| 7,665,241 B2 | 2/2010 | Oz |
| 7,676,977 B1 | 3/2010 | Cahill et al. |
| 7,681,886 B2 | 3/2010 | Morrow et al. |
| 7,694,973 B1 | 4/2010 | Hofmeister |
| 7,713,180 B2 | 5/2010 | Wickens et al. |
| 7,726,478 B2 | 6/2010 | Potterfield et al. |
| 7,730,824 B2 | 6/2010 | Black |
| 7,743,544 B2 | 6/2010 | Laney et al. |
| 7,753,441 B1 | 7/2010 | Gray, Jr. |
| 7,774,972 B2 | 8/2010 | Potterfield et al. |
| 7,779,572 B2 | 8/2010 | Potterfield et al. |
| 7,823,317 B2 | 11/2010 | Potterfield et al. |
| 7,845,267 B2 | 12/2010 | Potterfield et al. |
| 7,866,081 B2 | 1/2011 | Seuk |

(56) References Cited

U.S. PATENT DOCUMENTS

| | | | |
|---|---|---|---|
| 7,883,396 B2 | 2/2011 | Potterfield et al. | |
| 7,930,852 B1 | 4/2011 | Hubbard, Jr. | |
| 7,954,272 B2 | 6/2011 | Potterfield et al. | |
| 7,997,021 B2 | 8/2011 | Cauley | |
| 8,011,129 B2 | 9/2011 | Cauley et al. | |
| 8,104,212 B2 | 1/2012 | Potterfield et al. | |
| 8,123,180 B2 | 2/2012 | Shipman et al. | |
| 8,262,157 B2 | 9/2012 | Novak | |
| 8,296,988 B2 | 10/2012 | Yale et al. | |
| 8,336,708 B2 | 12/2012 | Potterfield et al. | |
| 8,371,057 B2 | 2/2013 | Coffield et al. | |
| 8,444,056 B2 | 5/2013 | Gamez et al. | |
| 8,496,212 B2 | 7/2013 | Keng et al. | |
| 8,556,036 B1 * | 10/2013 | Meredith | A01M 31/02 182/187 |
| 8,621,773 B2 | 1/2014 | Morrow et al. | |
| D709,295 S | 7/2014 | Winebrenner et al. | |
| 8,979,184 B2 | 3/2015 | Stafford et al. | |
| D727,046 S | 4/2015 | Alexander | |
| D727,047 S | 4/2015 | Alexander | |
| 9,151,561 B2 | 10/2015 | Morrow et al. | |
| 9,341,427 B2 | 5/2016 | Bricko et al. | |
| 9,474,376 B2 | 10/2016 | Drew | |
| 9,618,291 B1 | 4/2017 | Henderson | |
| 9,702,653 B2 | 7/2017 | Cauley, Jr. et al. | |
| 9,743,774 B1 | 8/2017 | Hauser | |
| 9,770,109 B2 | 9/2017 | Mailloux | |
| 10,028,587 B1 * | 7/2018 | Kersey | A47C 4/52 |
| 10,194,751 B1 * | 2/2019 | Frankel | A47C 9/105 |
| 10,264,893 B2 * | 4/2019 | Keilhauer | A47C 7/006 |
| 10,299,599 B2 | 5/2019 | Browning et al. | |
| D850,809 S | 6/2019 | Xiao | |
| 10,328,322 B1 | 6/2019 | King | |
| 10,514,225 B2 | 12/2019 | Cauley, Jr. et al. | |
| 10,578,389 B2 | 3/2020 | Kinney et al. | |
| 10,738,937 B2 | 8/2020 | Decker | |
| 10,874,216 B2 | 12/2020 | Grace | |
| 11,166,563 B2 * | 11/2021 | Chen | A47B 39/00 |
| 2002/0195752 A1 | 12/2002 | Yang | |
| 2003/0234205 A1 | 12/2003 | McGuyer et al. | |
| 2004/0112777 A1 | 6/2004 | Huang | |
| 2004/0134113 A1 | 7/2004 | Deros et al. | |
| 2005/0000141 A1 | 1/2005 | Cauley et al. | |
| 2005/0115137 A1 | 6/2005 | Minneman | |
| 2006/0038434 A1 | 2/2006 | Howell et al. | |
| 2006/0065560 A1 | 3/2006 | Dickenson et al. | |
| 2006/0175213 A1 | 8/2006 | Hurt et al. | |
| 2006/0230664 A1 | 10/2006 | Eddins | |
| 2006/0254111 A1 | 11/2006 | Giauque et al. | |
| 2006/0277811 A1 | 12/2006 | Peterson | |
| 2007/0051028 A1 | 3/2007 | Stordal | |
| 2007/0068379 A1 | 3/2007 | Sween et al. | |
| 2007/0068835 A1 | 3/2007 | Buie, III | |
| 2007/0074439 A2 | 4/2007 | Cauley et al. | |
| 2007/0094911 A1 | 5/2007 | Rush et al. | |
| 2007/0113460 A1 | 5/2007 | Potterfield et al. | |
| 2007/0256346 A1 | 11/2007 | Potterfield et al. | |
| 2007/0295197 A1 | 12/2007 | Potterfield | |
| 2008/0018142 A1 | 1/2008 | Yul | |
| 2008/0023379 A1 | 1/2008 | Potterfield et al. | |
| 2008/0054570 A1 | 3/2008 | Potterfield et al. | |
| 2008/0061509 A1 | 3/2008 | Potterfield | |
| 2008/0128002 A1 | 6/2008 | Jeffs | |
| 2008/0156671 A1 | 7/2008 | Jansson | |
| 2008/0174071 A1 | 7/2008 | Potterfield et al. | |
| 2008/0178641 A1 | 7/2008 | Himmen | |
| 2008/0231091 A1 | 9/2008 | Goranson | |
| 2008/0238158 A1 | 10/2008 | Jiu et al. | |
| 2008/0263928 A1 | 10/2008 | Potterfield | |
| 2009/0025267 A1 | 1/2009 | Reinert et al. | |
| 2009/0049731 A1 | 2/2009 | Seuk | |
| 2009/0113779 A1 | 5/2009 | Shipman et al. | |
| 2009/0126250 A1 | 5/2009 | Keng | |
| 2009/0140557 A1 | 6/2009 | Chen | |
| 2009/0174232 A1 | 7/2009 | Hoffman | |
| 2009/0188146 A1 | 7/2009 | Werner | |
| 2010/0102178 A1 | 4/2010 | Smith et al. | |
| 2010/0126055 A1 | 5/2010 | Potterfield | |
| 2010/0138032 A1 | 6/2010 | Potterfield | |
| 2010/0223832 A1 | 9/2010 | Lombardi | |
| 2010/0236125 A1 | 9/2010 | Morrow et al. | |
| 2010/0270201 A1 | 10/2010 | Cauley et al. | |
| 2011/0024985 A1 | 2/2011 | Potterfield et al. | |
| 2011/0036214 A1 | 2/2011 | Potterfield | |
| 2011/0094140 A1 | 4/2011 | Letson | |
| 2011/0187164 A1 | 8/2011 | Corcorran et al. | |
| 2011/0192069 A1 | 8/2011 | Potterfield et al. | |
| 2012/0174460 A1 | 7/2012 | Hicks | |
| 2012/0175844 A1 | 7/2012 | Potterfield | |
| 2012/0186125 A1 | 7/2012 | Werner | |
| 2012/0267923 A1 | 10/2012 | Bouche | |
| 2012/0274107 A1 | 11/2012 | Chesness | |
| 2013/0049410 A1 | 2/2013 | Stafford et al. | |
| 2013/0058192 A1 | 3/2013 | Gateman et al. | |
| 2013/0061508 A1 | 3/2013 | Nelson et al. | |
| 2014/0001801 A1 | 1/2014 | Hutchinson | |
| 2014/0132037 A1 | 5/2014 | Niemela | |
| 2015/0096216 A1 | 4/2015 | Hughes | |
| 2015/0354913 A1 | 12/2015 | Morrow et al. | |
| 2016/0003571 A1 | 1/2016 | Kleinfelder | |
| 2016/0021869 A1 | 1/2016 | George | |
| 2016/0193518 A1 | 7/2016 | Baxter et al. | |
| 2017/0102203 A1 | 4/2017 | Cauley, Jr. et al. | |
| 2017/0208952 A1 | 7/2017 | Simon et al. | |
| 2017/0251803 A1 | 9/2017 | Rehkemper et al. | |
| 2017/0273451 A1 | 9/2017 | Jeanphilippe | |
| 2017/0340100 A1 | 11/2017 | Tsai | |
| 2018/0172385 A1 | 6/2018 | Hale | |
| 2018/0184788 A1 | 7/2018 | Binding | |
| 2019/0056060 A1 | 2/2019 | Decker | |
| 2019/0082846 A1 | 3/2019 | Grace | |
| 2019/0231075 A1 | 8/2019 | Browning et al. | |
| 2019/0285376 A1 | 9/2019 | Bales | |
| 2020/0033089 A1 | 1/2020 | Morrow et al. | |
| 2022/0265048 A1 | 8/2022 | Fankel et al. | |
| 2022/0386779 A1 | 12/2022 | Garcia | |
| 2023/0000238 A1 | 1/2023 | Sun | |

FOREIGN PATENT DOCUMENTS

| | | | |
|---|---|---|---|
| EP | 0624455 | 11/1994 | |
| GB | 475080 | 11/1937 | |
| KR | 101493888 B1 | 2/2015 | |
| WO | WO-9519537 A1 * | 7/1995 | A01M 31/02 |
| WO | 2016195400 A1 | 12/2016 | |
| WO | 2021257958 A1 | 12/2021 | |
| WO | 2022256552 A1 | 12/2022 | |

OTHER PUBLICATIONS

Cabela's, "Sharp Shooter Rifle Rest," http://www.cabelas.com/cabelas/en/templates/links/link.jsp?id=0005816222738a&type=product&cmCat=, © 1996-2008, 2 pgs. [Internet accessed on Aug. 6, 2008].

Lahti Company, Evaluator Brochure, http://www.lathicompany.com/Forms/EvaluatorBrochure2.jpg, 2 pgs., accessed Jan. 16, 2006.

MacksPW.com, "Desert Mountain Bench Master Rifle Rest," http://www.macksqw.com/Item-i-DESBM1, © 2004-2008, 1 pg. [Internet accessed Jul. 22, 2008].

Midway USA, "Shooters Ridge Steady Point Rifle Shooting Rest," http://www.midwayusa.com/eproductpage.exe/showproduct?saleitemid=826745&t=11082005, 2005, 5 pgs. [Internet accessed on Aug. 6, 2008].

Sweeney, P "Gunsmithing: Measure Headspace, Peterson's Rifleshooter," http://www.rifleshootermag.com/gunsmithing/headspace_0612/, 4 pgs. [Internet Accessed Dec. 11, 2004].

MidwayUSA, "ADG Rifle Shooting Rest," http://www.midwayusa.com/eproductpage.exe/showproduct?saleitemid=992071&t=11082005, 2005, 3 pgs. [Internet accessed on Aug. 6, 2008].

MidwayUSA, "Caldwell Full Length Fire Control Shooting Rest," http://www.midwayusa.com/eproductpage.exe/showproduct?saleitemid=

(56) References Cited

OTHER PUBLICATIONS

683866&t=11082005, 2005, 3 pgs. [Internet accessed on Aug. 6, 2008].

MidwayUSA, "Caldwell Lead Sled DFT Rifle Shooting Rest," http://www.midwayusa.com/eproductpage.exe/showproduct?saleitemid=149023&t=11082005, 2005, 6 pgs. [Internet accessed on Aug. 6, 2008].

MidwayUSA, "Caldwell Lead Sled Rifle Shooting Rest," http://www.midwayusa.com/eproductpage.exe/showproduct?saleitemid=152664&t=11082005, 2005, 8 pgs. [Internet accessed on Aug. 6, 2008].

MidwayUSA, "Caldwell Steady Rest NXT Rifle Shooting Rest," http://www.midwayusa.com/eproductpage.exe/showproduct?saleitemid=838651&t=11082005, 2005, 4 pgs. [Internet accessed on Aug. 6, 2008].

MidwayUSA, "Caldwell Zero-Max Rifle Shooting Rest," http://www.midwayusa.com/eproductpage.exe/showproduct?saleitemid=726222&t=11082005, 2005, 3 pgs. [Internet accessed on Aug. 6, 2008].

MidwayUSA, "CTK Precision P3 Ultimate Shooting Rest," http://www.midwayusa.com/eproductpage.exe/showproduct?saleitemid=114699&t=11082005, 2005, 2 pgs. Internet accessed on 8/6/20081.

MidwayUSA, "Hyskore® dangerous Game Rifle Shooting Rest," http://www.midwayusa.com/eproductpage.exe/showproduct?saleitemid=729197&t=11082005, 2005, 3 pgs. [Internet accessed on Aug. 6, 2008].

MidwayUSA, "Hyskore® Precision Gas Dampened Recoil Reducing Rifle Shooting Rest," http://www.midwayusa.com/eproductpage.exe/showproduct?saleitemid=838848&t=11082005, 2005, 3 pgs. [Internet accessed on Aug. 6, 2008].

MidwayUSA, "Hyskore® Swivel Varmint Rifle Shooting Rest," http://www.midwayusa.com/eproductpage.exe/showproduct?saleitemid=587606&t=11082005,2005, 3 pgs. [Internet accessed on Aug. 6, 2008].

MidwayUSA, "Shooters Ridge Steady Point Rifle Shooting Rest with Vise," http://www.midwayusa.com/eproductpage.exe/showproduct?saleitemid=341095&t=11082005, D 2005, 4 pgs. [Internet accessed on Aug. 6, 2008].

MidwayUSA, "Shooting Supplies—Shop Everything for Your Firearm at MidwayUSA," http://www.midwayusa.com/browse/BrowseProducts.aspx?categoryStrin . . . , 15 pgs. [Internet accessed on Jul. 21, 2008].

MidwayUSA, "Stoney Point Bench Anchor Rifle Shooting Rest," http://www.midwayusa.com/eproductpage.exe/showproduct?saleitemid=347174&t=11082005, 2005, 2 pgs. [Internet accessed on Aug. 6, 2008].

Milek, B., "Handloading for Hunting New Products from RCBS, Lee, Accurate Arms," Peterson's Hunting, Mar. 1985, p. 21. 1 pg.

Sinclair International, Sinclair Shooting Rests, Products for the Precision Shooter, 2002, Issue No. 2002-B, pp. 76-78.

Shooters Ridge, "Shooting Rest with Gun Vise," http://www.shootersridge.com, 1 pg. [Internet accessed Jul. 17, 2008].

Shooters Ridge, "Deluxe Rifle Rest," http://www.shootersridge.com, 1 pg. [Internet accessed Jul. 21, 2008].

Protektor Model, "The Original Leather Rifle and Pistol Rest," http://www.protektormodel.com/, 12 pgs. [Internet accessed on Feb. 14, 2006].

Precision Shooting, Inc., Bald Eagle Front Rest, The Accurate Rifle, vol. 6, Issue No. 4, May 2003, p. 47. 1 pg.

"Cleaning Cradles: Sinclaire Cleaning Cradles" p. 21. 1 pg. The date on which the Sinclair Folding Cleaning Cradle was first on sale is not known, but is believed to be circa 2004.

"Decker Rifle Vise", 1 pg. The date on which the Decker Rifle Vise was first on sale is not known, but is believed to be circa 2004.

"The Grabber and Hustler '76," MEC—Mayville Engineering Company, Inc., 2 pgs., undated.

1Shop2.com. "Hoppe's Gunsmith's Fully Adjustable Bench Vise", 3 pgs. The date on which The Hoppe's Gunsmith's Fully Adjustable Bench Vise was first on sale is not known, but is believed to be circa 2004.

AcuSport Outdoor Sporting Products, 3 pgs.

Cabela's: World's Foremost Outfitter. "HySkore Sighting System and Cleaning Vise". 1 pg. The date on which the HySkore Sighting System and Cleaning Vise was first on sale is not known, but is believed to be circa Jan. 2005. However, a prototype of this product may have been shown to buyers at Cabela's circa Aug. 2004.

CV-500, 3 pgs. [product photos].

Ellett Brothers, Rests & Gun Vises, 3 pgs.

Four photos of the Lohman Sight Vise. 4 pgs. The date on which the Lohman Sight Vise was first on sale is not known, but is believed to be circa 2004.

Lahti Company Brochure, "Rifle Evaluator: No Pain, No Fear, No Flinching, No Body Movement," www.lahticompany.com, 2 pgs., Undated.

Midway USA. "Tipton Range Box with Ultimate Rifle, Handgun Cleaning Kit (No Solvents)". <URL: http://www.midwayusa.com/rewriteaproducU135086>. 2 pgs. The date on which the Tipton Range Box was first on sale is not known, but is believed to be circa 2004.

Millett, "BenchMaster Shooting Rests," 1 pg. Undated.

MTM Case-Gard. "Gun Maintenance Centers." 2 pgs. The date on which the MTM Gun Maintenance Center was first on sale is not known, but is believed to be circa 2004.

MTM Case-Gard. "Rifle rest and pistol shooting rest". <URL: http://www.mtmcasegard.corn/products/shooting/shoo.html>. 3 pgs. The date on which the MTM Site-In-Clean was first on sale is not known, but is believed to be circa 2004.

MTM Shoulder-Gard Rifle Rest, MTM Case-Gard, p. 2 "Rests", 1 pg.

Tenex Precision Co. "Recoil A-Rest-R" Product Pictures, 4 sheets, Riverside CA.

The Sportsman's Guide. "Plano Shooters Case!" <URL: http://www.sportsmansguide.com/cb/cb.asp?a=148225>. 3 pgs. The date on which the Plano Shooters Case was first on sale is not known, but is believed to be circa 2004.

Caldwell Shooting Supplies Manual, Deadshot Fieldpod, Usage and Maintenance Instructions, Product #488000—Instruction #1015026, 8 pages, published prior to Jan. 16, 2017.

"American Rifleman: What to do about recoil," LookSmart, http://www.findarticles.com/p/articles/mi_qa3623/is_199907/ai_n886159/print, pp. 1-4, accessed Jan. 4, 2006.

Hyskore: Professional Shooting Accessories, "Hydraulic Trigger Release," www.hyskore.com, 7 pgs. [Internet accessed Feb. 22, 2006].

Hyskore: Professional Shooting Accessories, "Dangerous Game Machine Rest," www.hyskore.com, 10 pgs. [Internet accessed Feb. 22, 2006].

Hyskore, "Rest—Dangerous Game Machine Rest," Hyskore Rest, Professional firearm rests, http://www.hyskore.com/rests.htm, 2 pgs. [Internet accessed Jul. 21, 2008].

"Uncle Bud's Bull Bags," http:www.unclebudscss.com/pages/Bulls%20bags.html, 2 pgs. [Internet accessed on Feb. 14, 2006].

"Uncle Bud's Udder Bag," http:www.unclebudscss.com/pages/Udder%20Bags.html, 2 pgs. [Internet accessed on Feb. 14, 2006].

"Gun Rest-Shooting Rest-Rifle Rests," http://www.exploreproducts.com/gunrests-shootingrests.htm, 6 pgs. [Internet accessed Jul. 18, 2008].

Grafix® Plastics, http://www.grafixplastics.com/plastic_film_g.asp?gclid=CK-5-7gnY4CFRVNhQodjFhfSQ, 29 pgs. [Internet accessed on Aug. 30, 2007].

Amazon.com, "Ctk® P3 Ultimate Shooting Rest," Sports & Outdoors, http://www.amazon.com/CTK%C2%AE-P3-Uitimate-Shooting-Rest/dp/. . . , 1 pg. [Internet accessed on Jul. 22, 2008].

Amazon.com, "SHTRS RDG Steady PNT Rifle Rest DLX, Grips/Pads/Stocks, Gun Accessories, Hunting & Shooting Accessories, Hunting Gear, Fishing & Hunting," http://www.amazon.com/STEADY-Accessories-Hunting-Shooting-Fishin . . . , 1 pg. [Internet accessed on Jul. 22, 2008].

Amazon.com, "Stoney Point Adjustable Shooting Rest w/Bag," Sports & Outdoors, http://www.amazon.com/Stoney-Point-Adjustable-Shooting-Rest/dp/BO .. , 1 pg. [Internet accessed on Jul. 22, 2008].

Basspro.com, "Bass Pro Shops Outdoors Online: Offering the best in Fishing, Hunting and Outdoor Products," http://www.basspro.

(56) References Cited

OTHER PUBLICATIONS com/webapp/wcs/stores/servlet/Product 10151-1 10001 95064 SearchResults, 2 pgs. [Internet accessed on Aug. 6, 2008].
Battenfeld Technologies, Inc., "Gun Vise," Tipton Gun Cleaning Supplies, Battenfeld Technologies, Inc. 2004 Catalog, p. 32, Product No. 782-731, 2 pgs.
Battenfeld Technologies, Inc., "Steady Rest Portable Shooting Rest," file://C:\DOCUME-1\DUTCD\LOCALS-1\Temp\PQ28V28J.htm, 1 pg., accessed Jan. 25, 2006.
Big Boy Gun Toys, "Shooting Rest," http://www.bigboyguntoys.com/shootingrest.htm, 1 pg. [Internet accessed on Jul. 18, 2008].
Boyt Harness Company, Product Catalog, http://www.boytharness.com/catalog/index.php?cPath=22, 2 pgs. [Internet accessed on Jul. 21, 2008].
Brownells, Inc., Catalog No. 41, 1988-1989, 3 pgs.
Brownells, Inc., Catalog No. 57, 2004-2005, 2 pgs.
Brownells, Inc., Catalog No. 47, 1994-1995, 2 pgs.
Brownells, Inc., Sight Base Cutters, Faxed Dec. 17, 2003, 1 pg.
Cabela's Hunting Fishing and Outdoor Gear Master Catalog, Fall2002, Edition II, Minimizer Rifle Rest, Item No. SC-22-4332 and SC-22-4333, p. 492.
Edgewood Shooting Bags Catalog, http://www.edgebag.com/catalog.php, 7 pgs. [Internet accessed on Feb. 14, 2006].
Cabela's. "Master Catalog Fall 2003: Late-Season Edition". Cover page and p. 416. 2 pgs.
Cabela's, "BenchBuddy® Gun Rest," http://www.cabelas.com/cabelas/en/templates/links/link.jsp?id=0005819221954a&type=product&cmCat=, © 1996-2008, 2 pgs. [Internet accessed on Aug. 6, 2008].
Cabela's, "Elite Rifle Rest," http://www.cabelas.com/cabelas/en/templates/links/link.jsp?id=0005817227855a&type=product&cmCat=, © 1996-2008, 2 pgs. [Internet accessed on Aug. 6, 2008].
Cabela's, "Hyskore® Dangerous Game™ Machine Rest," http://www.cabelas.com/cabelas/en/templates/links/link.jsp?id=0044091228566a&type=product&cmCat=, © 1996-2008, 2 pgs. [Internet accessed on Aug. 6, 2008].
Cabela's, "Hyskore® Ultimate Sighting Rest," http://www.cabelas.com/cabelas/en/templates/links/link.jsp?id=0024152226083a&type=product&cmCat=, 1996-2008, 2 pgs. [Internet accessed on Aug. 6, 2008].
Cabela's, "Nitro Shoulder Shield Rest," http://www.cabelas.com/cabelas/en/templates/links/link.jsp?id=0040862228231a&type=product&cmCat=, © 1996-2008, 2 pgs. [Internet accessed on Aug. 6, 2008].
Cabela's, "Premier Rifle Rest," http://www.cabelas.com/cabelas/en/templates/links/link.jsp?id=0020904227856a&type=product&cmCat= .. , © 1996-2008, 2 pgs. [Internet accessed on Aug. 6, 2008].
Cabela's, "Secure Bench Rest," http://www.cabelas.com/cabelas/en/templates/links/link.jsp;jsessionid=4FOLPOOW2HMRLLAOBBISCOF .., © 1996-2008, 2 pgs. [Internet accessed on Aug. 6, 2008].
Cabela's, "Sharp Shooter Auto Magnum Rifle Rest," http://www.cabelas.com/cabelas/en/templates/links/link.jsp?id=0054107229088a&type=product&cmCat=, © 1996-2008, 2 pgs. [Internet accessed on Aug. 6, 2008].
Cabela's, "Shooting Benches & Portable Rifle Shooting Bench Rest," http://www.cabelas.com/ssubcat-1/cat20793.shtml, 3 pgs. [Internet accessed Jul. 18, 2008].
Cabela's, "Sure Shot Shooting Vise/Rest," http://www.cabelas.com/cabelas/en/templates/product/standard-item.jsp?id=00348272 277 . . . , © 1996-2008, 2 pgs. [Internet accessed on Jul. 15, 2008].
Caldwell Shooting Supplies, 2006 Catalog, pp. 18, 5, 12, 14 and 15. 5 pgs.
Californiavarmintcallers.com—Forum, http://californiavarmintcallers.com/community/modules/newbb/viewtopic.php?topic_id=10&forum=9&PHPSESSID=074ed8c7 . . . pages 1-4 accessed Jan. 16, 2006.
Canadian Camo, "Gun Rest," https://media5.magma.ca/www.canadiancamo.com/catalog/product_info.php?products_id= . . . , 2 pgs. [Internet accessed on Feb. 13, 2006].
Champion Traps & Target, 2005 Product Catalog, 12 pgs.
CTK Precision, "P3 Ultimate Shooting Rest," http://www.ctkprecision.com/index.asp?PageAction=VIEWPROD&ProdOID=2, 3 p. [Internet accessed on Jul. 18, 2008].
CTK Precision, All Products, http://www.ctkprecision.com/index.asp?PageAction=VI EWCATS&Cate .. , 3 pgs. [Internet accessed on Jul. 22, 2008].
E. Arthur Brown Company, "A Shooting Rest that Really Works .. ,"http://www.eabco.comfTargetShooting01.html, © 2007-2008, 1 pg. [Internet accessed Jul. 18, 2008].
Really Right Stuff Vyce Photos, 3 Pages, At Least as Early As Jan. 1, 2018.
Vyce Equipment Support Mount, 2 Pages, At Least as Early As Jan. 1, 2018 (Internet Accessed May 25, 2018).
Hog Saddle PIG0311-G Field Tripod, 4 Pages, At Least as Early As Jan. 1, 2018 (Internet Accessed May 25, 2018).
MOD7 Hog Saddle, 4 Pages, At Least as Early As Jan. 1, 2018 (Internet Accessed May 25, 18).
Bog Super Steady Combo, 2 Pages, At Least as Early As Jan. 1, 2017 (Internet Accessed May 25, 2018).
Caldwell Shooting Supplies, Assembly and Usage Instructions for the Stable Table Shooting Bench, Instruction #1000196, Revision E, Jan. 1, 2017, 4 pages.
Caldwell Shooting Supplies, Assembly and Usage Instructions, BR Pivot Shooting Bench, Instruction #1001667, Jan. 1, 2017, 6 pages.
Herter's Deluxe Shooting Bench: Cabela's, 2 pages, accessed Jan. 8, 2018, <https://www.cabelas.com/product/HERTERS-SHOOTING-BENCH/2201557.uts?slotld=0>.
MSB200-Muddy Deluxe Shooting Bench, 4 pages, accessed Jan. 8, 2018.
Muddy, The Swivel Action Shooting Bench, 4 pages, accessed Jan. 8, 2018, <https://shop.gomuddy.com/the-swivel-action-shooting-bench/>.
Muddy, The Xtreme Shooting Bench, 4 pages, accessed Jan. 8, 2018.
Caldwell Shooting Supplies, DeadShot ChairPod, Usage and Assembly Instructions, Admitted Prior Art (at least as early as Jan. 2021), 8 pages.
Caldwell Shooting Supplies, DeadShot TreePod, Usage and Assembly Instructions, Admitted Prior Art (at least as early as Jan. 2021), 8 pages.
Battenfeld Technologies, Inc., Caldwell DeadShot ChairPod, YouTube video available at https://www.youtube.com/watch?v=1HkgOjgGL8E, Sep. 22, 2015, 1 page.
Optics Warehouse, Bog Pod Death Grip Tripod—Quickfire Review, YouTube video available at https://www.youtube.com/watch?v=bbPc-RNG300, Apr. 26, 2020, 1 page.
Nexcam Axis SG 360; https://web.archive.org/we/20221007123252/https://nexcam.com/shop/nexcam-axi-sg-360-shooting-chair/ (Year: 2022).

* cited by examiner

SHOOTING REST CHAIR

CROSS-REFERENCE TO RELATED APPLICATION

The present application is a continuation of and claims priority to U.S. application Ser. No. 17/659,222, filed Apr. 14, 2022, which claims priority to U.S. Provisional Application No. 63/175,361, filed Apr. 15, 2021, the entireties of which are hereby incorporated by reference.

FIELD

The present disclosure generally relates to firearm shooting accessories, and more particularly to a stowable shooting rest chair that is adaptable for left and right handed shooters.

BACKGROUND

Shooting rest chairs are used to support and stabilize a shooter firing a firearm and usually also to support and stabilize the firearm being fired. Some shooting rest chairs have limitations when it comes to being adaptable for left and right handed shooters.

SUMMARY

In one aspect, a shooting rest chair for supporting a shooter and a weapon above a support surface comprises a base, a seat, a pivot hub, and a weapon support arm assembly. The base is configured to rest on the support surface. The seat is supported by the base, and the seat is sized and shaped to support the shooter when the shooter is sitting on the seat. The pivot hub is supported by the base and connects the base to the seat. The weapon support arm assembly is connected to the pivot hub by a first pivot connection. The weapon support arm assembly is configured to support the weapon. The weapon support arm assembly is pivotable with respect to the base and the seat about the first pivot connection.

In another aspect, a portable chair for supporting a person above a support surface comprises a base and a seat. The base is configured to rest on the support surface and is configurable in a deployed configuration and in a collapsed configuration. The seat includes a holder under the seat, and the seat is supported by the base. The seat is sized and shaped to support the person when the person is sitting in the seat. The portable chair is configurable in an operational configuration and in a stowed configuration.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
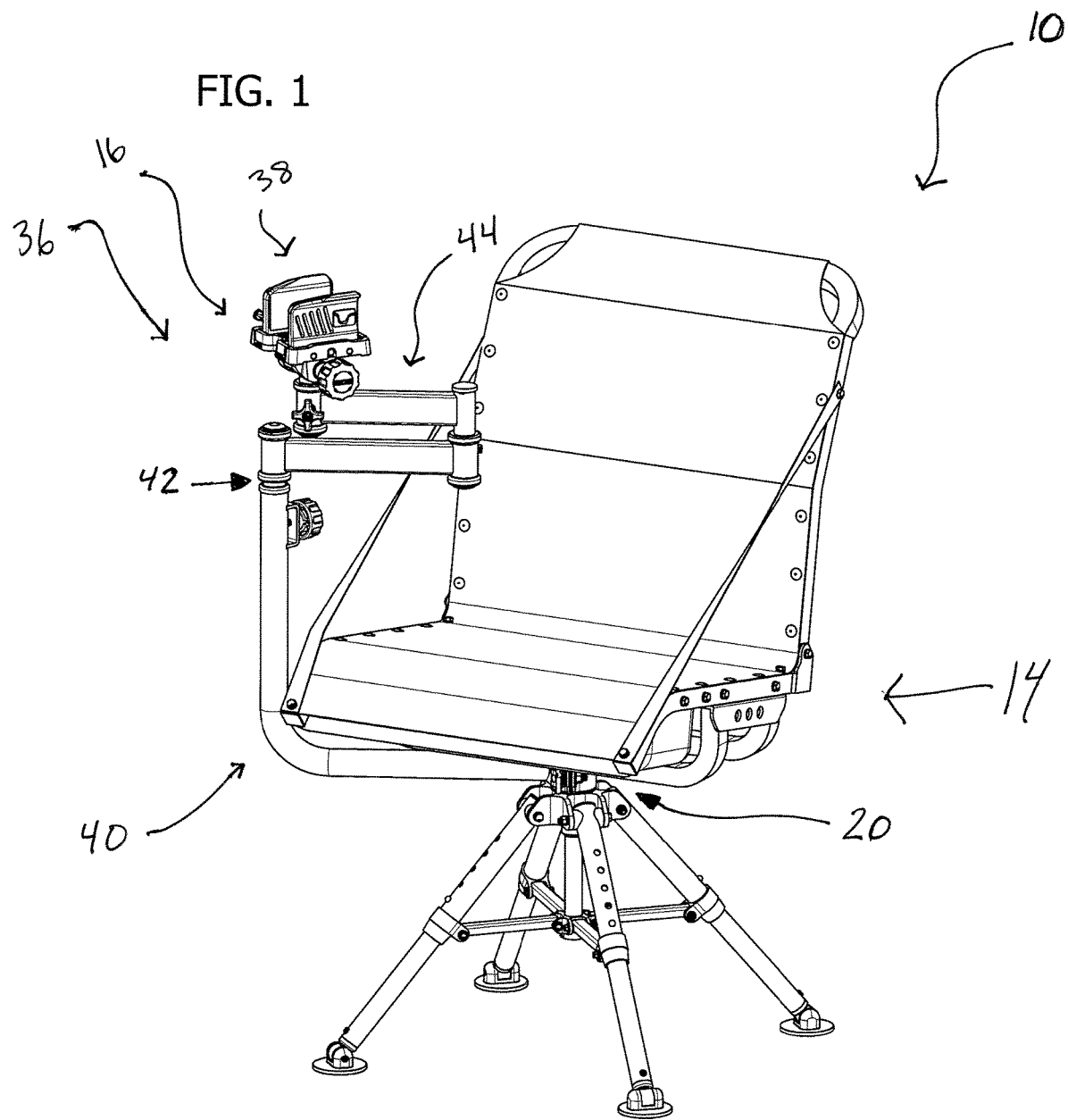
FIG. 1 is a perspective of a shooting rest chair.

Referring to FIG. 1, the shooting rest chair 10 is designed to support a sitting person (e.g., a shooter) and a firearm to be fired by the person. As will become apparent, the shooting rest chair 10 is configurable between operational and stowed configurations. In the operational configuration, the shooting rest chair is adjustable to adapt for left-handed and right-handed shooters.

Figure 2:
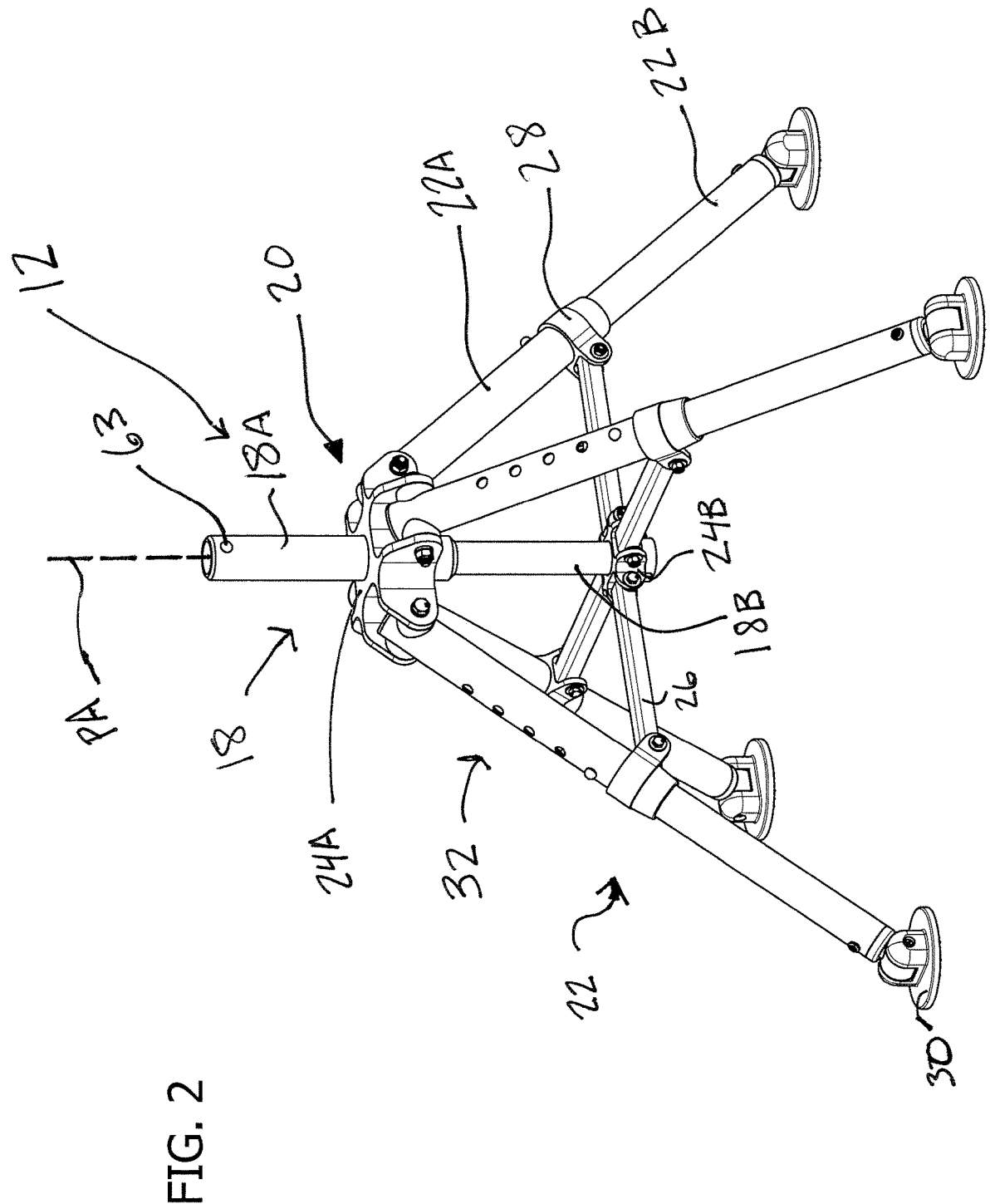
FIG. 2 is a perspective of a base of the chair.
Figure 3:
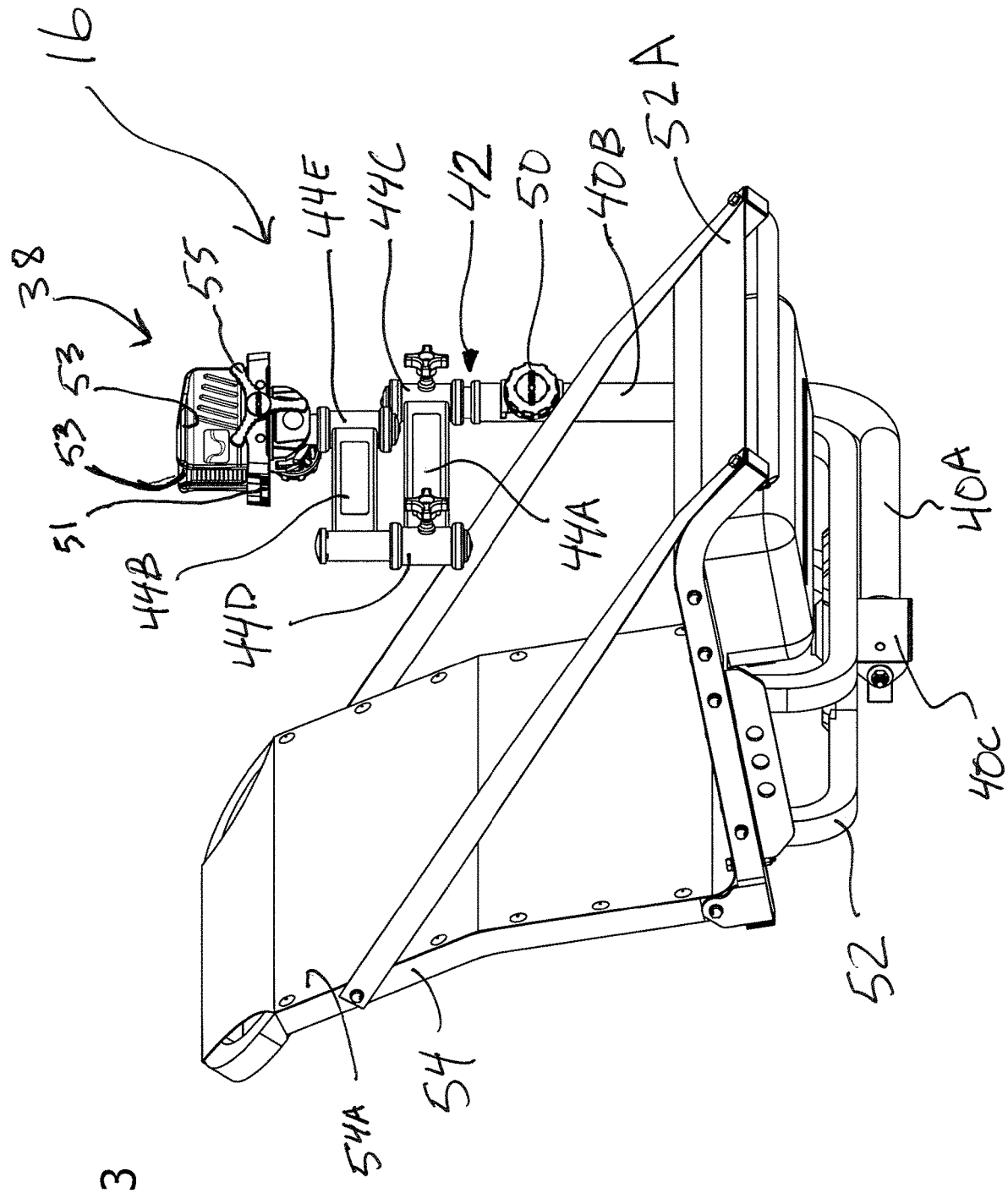
FIG. 3 is a perspective of a seat and weapon support arm assembly of the chair.

Referring to FIGS. 1-3, the shooting rest chair 10 generally includes a base 12 and a seat 14 (chair components) that together make up (broadly, "a chair"), and a weapon support arm assembly 16. The seat and weapon support arm assembly are pivotable with respect to each other about a post 18 supported by the base which defines a generally vertical pivot axis PA. As will be explained in further detail, the post 18 pivotably supports the weapon support arm assembly 16 at the top of the base and below the seat 14 (broadly, "pivot connection") to permit the weapon support arm assembly to rotate to left and right sides of the seat, thereby allowing the shooting rest chair 10 to be usable by left-handed and right-handed shooters.

The base 12 includes a plurality of legs 22, upper (first) and lower (second) post portions 18A, 18B, upper (first) and lower (second) collars 24A, 24B, and pivot links 26. The upper post portion 18A and upper collar 24A form a pivot hub 20 to which the seat 14 and weapon support arm assembly are pivotably connected. Together, the upper and lower post portions 18A, 18B form the post 18 (column) that defines the pivot axis PA that permits pivotable rotation of the chair and the weapon support arm assembly. As will become apparent, the post portions are supported by the plurality of legs 22. In the illustrated embodiment, the upper and lower post portions 18A, 18B can be extended (deployed) and retracted (collapsed) by a telescoping post connection. The upper collar 24A is an unthreaded "O" collar that defines a hollow interior that extends around upper post portion 18A. The upper collar 24A includes an exterior having four pivot connectors, one for each leg, spaced apart around the exterior of the upper collar. Likewise, the lower collar 24B is an unthreaded "O" collar that defines a hollow interior that extends around the lower post 18B. The lower collar 24B includes an exterior having four pivot connectors, one for each pivot link 26, spaced apart around the exterior of the lower collar. The upper and lower collars 24A and 24B are sized and shaped to engage the respective upper and lower posts, 24A and 24B, respectively. In the illustrated embodiment, the upper collar 24A is sized and shaped to be larger than the lower collar 24B.

Each of the legs 22 includes an upper (first) leg portion 22A a lower (second) leg portion 22B, and a leg connector collar 28, and has an associated pivot link 26. The upper leg portion 22A includes a proximal end pivotably connected to the upper collar 24A. The lower leg portion 22B has a proximal end telescopically received in the distal end of the upper leg portion 22A. The leg connector collar 28 assists the telescopic connection of the upper leg portion and the lower leg portion. Feet 30 are connected to the distal ends of the lower leg portions 22B for contacting the ground (broadly, "support surface"). The pivot links 26 connect the leg connector collar 28 to the pivot connectors of the lower collar 24B. Retainers 32 (e.g. spring biased detents) carried by the lower leg portions 22B are receivable in a series of openings in the upper leg portions 22A for selectively adjusting a length of each leg.

Figure 8:
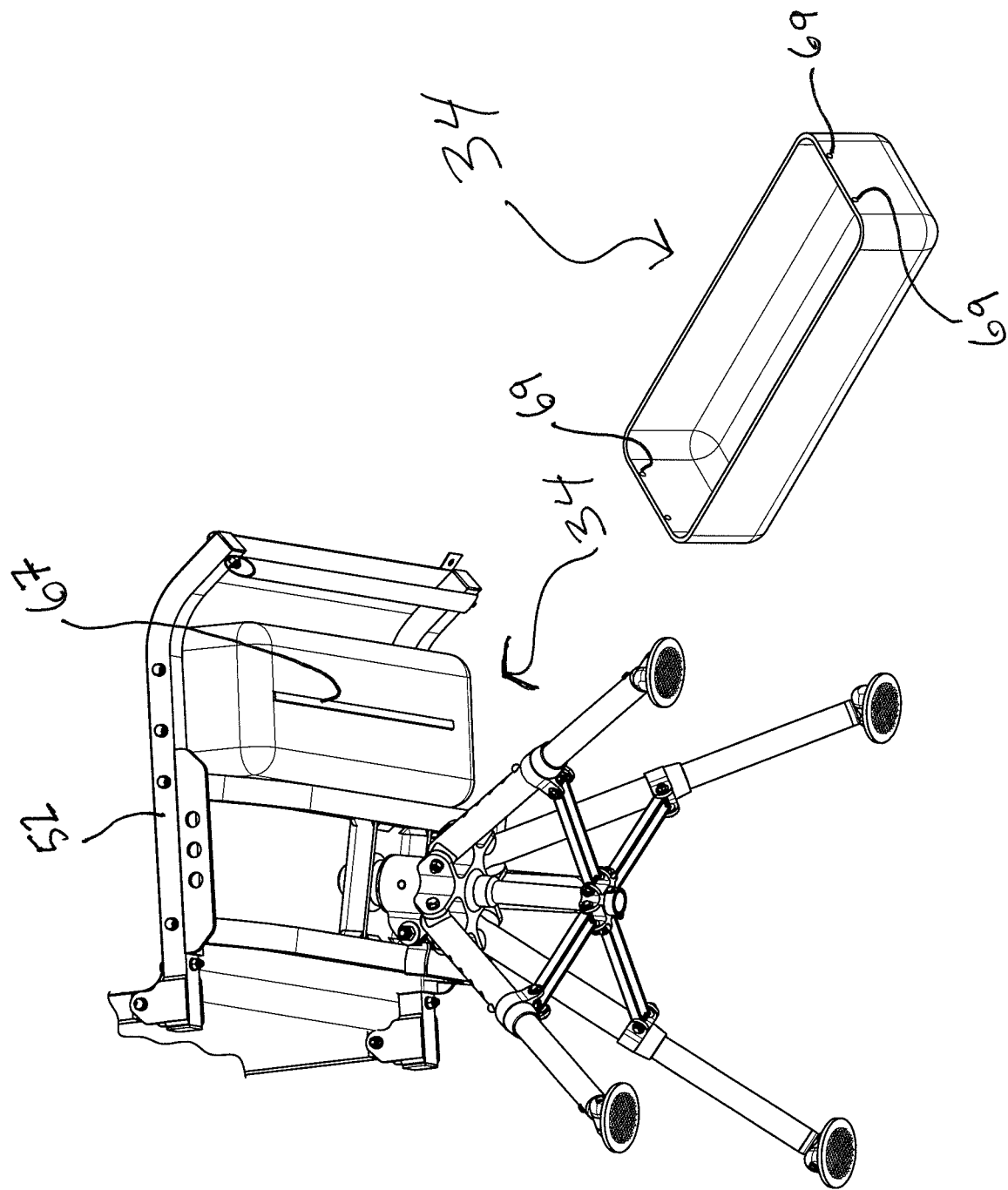
FIG. 8 is a bottom perspective of the shooting rest chair.

The base 12 is configurable between a deployed configuration and a collapsed configuration. FIGS. 1, 2, and 8 show the base 12 in the deployed configuration. In the deployed configuration, the legs are arranged to engage the support surface to support the seat above the support surface. For example, the support surface can be an exterior surface such as turf, pavement, and/or gravel, etc. or can be an interior surface such as a floor.

When the base 12 is in the deployed configuration, the four legs 22 are extended outward from the pivot hub 20 to the ground. Each leg forms about a 45-degree angle with respect to the pivot axis PA. The pivot links 26 are extended in a direction transverse the pivot axis PA to provide support to the base via connection to the lower post portion 18B. It will be appreciated that the upper post 18A protrudes upward to be exposed above the upper collar 24A. Bases having other configurations (e.g., more or fewer legs) can be used without departing from the scope of the present disclosure.

When the base 12 is in a collapsed configuration (not shown), the four legs are folded inward toward the lower post portion 18B so each leg is about parallel with respect to the pivot axis PA. The lower post portion 18B is retracted into the upper post portion 18A and the pivot links 26 are pivoted inward toward the pivot axis PA. Further, the lower leg portion 22B is retracted into the upper leg portion 22A such that the detent carried by the proximal end of the lower leg portion is generally near the proximal end of the upper leg portion. As will be explained below, when in the collapsed configuration, the base 12 is sized and shaped to fit in a holder 34 located under the seat 14. FIG. 8 shows two instances of the holder 34, one connected to the seat, and another removed from the seat.

Figure 4:
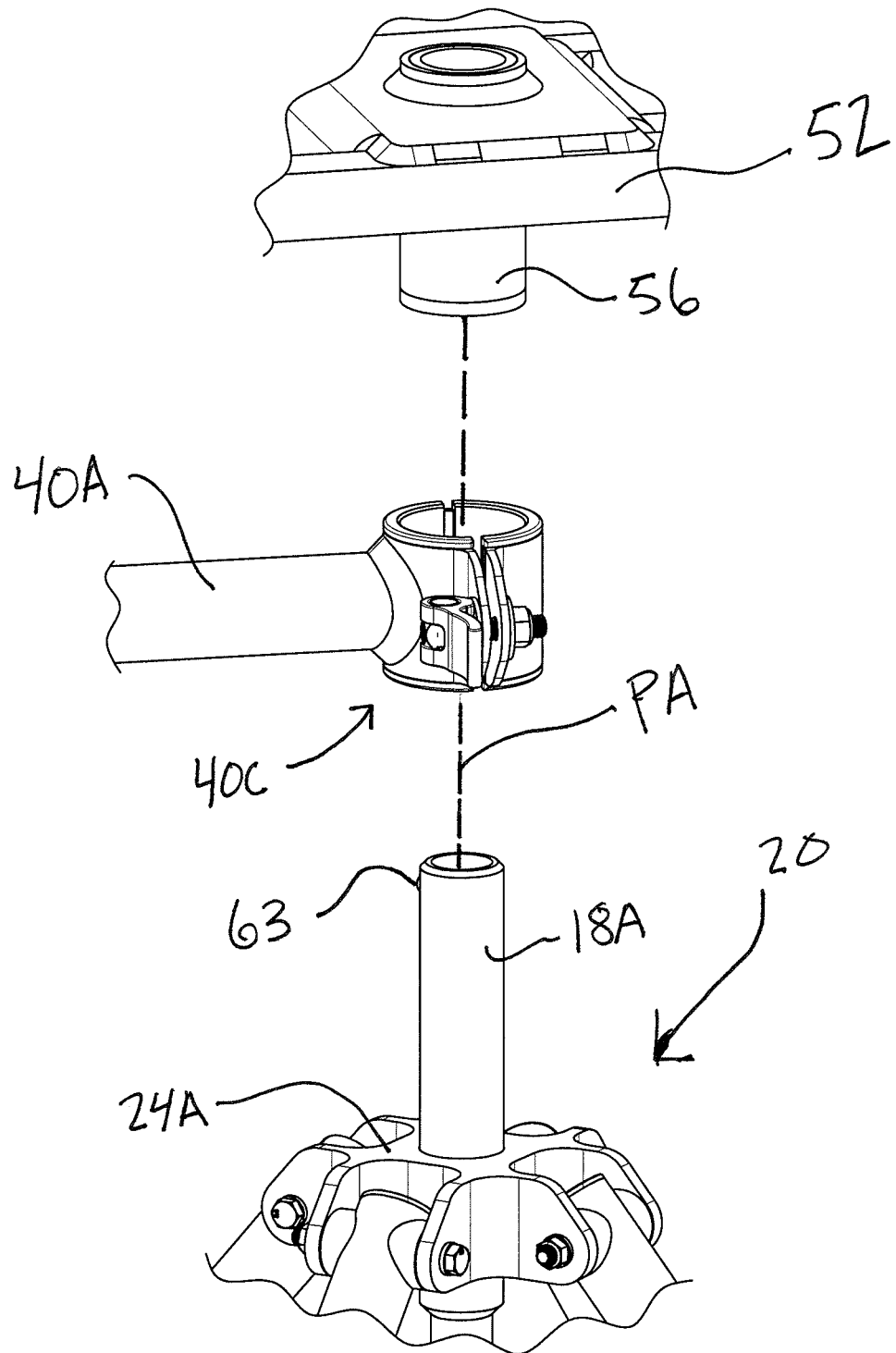
FIG. 4 is an exploded perspective of a connection of the base, seat, and weapon support arm assembly.

Referring to FIGS. 1, 3, and 4, the weapon support arm assembly 16 is configured to rotate about the upper post portion 18A (pivot axis PA) to left and right sides of the seat 14 for respective left and right handed shooters. The weapon support arm assembly 16 comprises an arm 36 and a weapon holder (broadly, "weapon rest") 38. The arm comprises first, second, and third arm portions, 40, 42, and 44. The first arm portion includes a first segment 40A and a second segment 40B. A proximal end of the first segment 40A includes a first pivot connector 40C configured to pivotably connect to the upper post portion 18A when the upper post portion is in the deployed configuration. The first segment 40A extends distally from the first pivot connector 40C located at the pivot hub 20 laterally outward a distance sufficient to extend outboard of a periphery of the seat. The first segment 40A has a length longer than a length of the center of the seat 14 to an edge of the seat. The second segment 40B of the first arm portion 40 includes a proximal end connected to the first arm segment 40A below the seat 14, and the second segment 40B extends distally to a distal end above the seat. The second segment 40B is generally upstanding (e.g., generally parallel with the generally vertical pivot axis PA). Other configurations of a weapon support arm assembly can be used without departing from the scope of the present disclosure.

Figure 5:
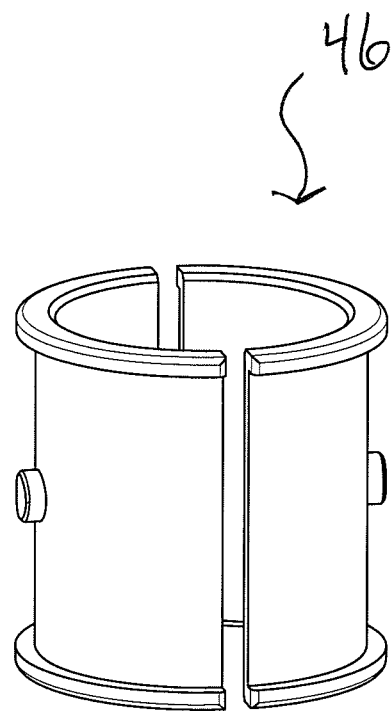
FIG. 5 is an exploded perspective of a first pivot connector.
Figure 5:
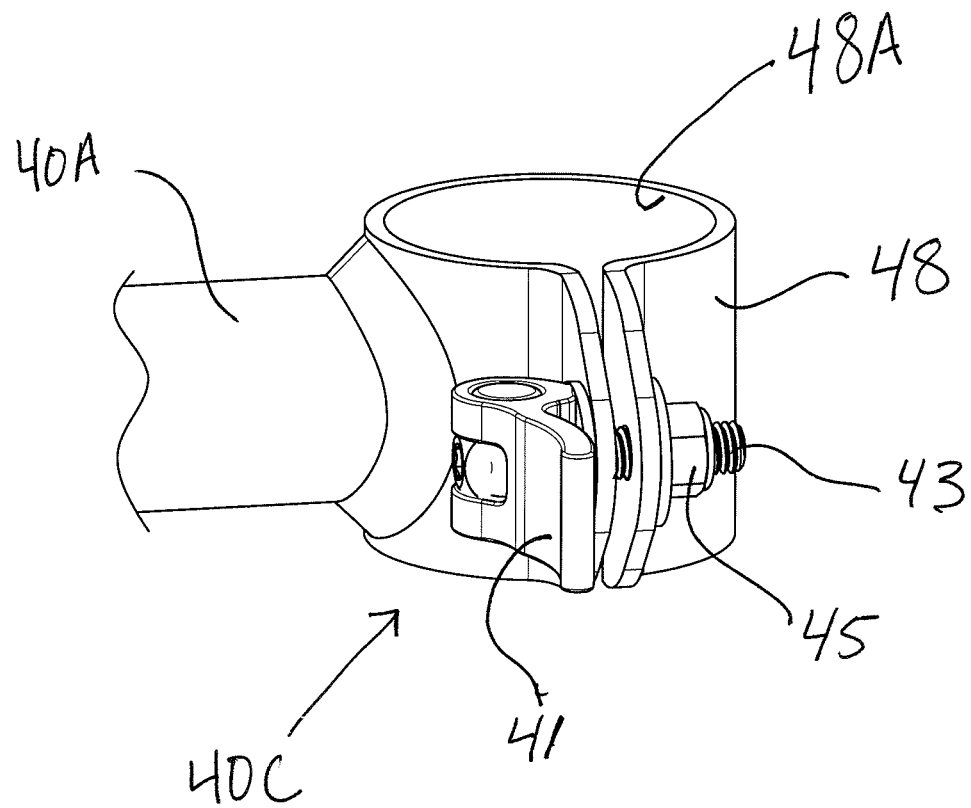
Figure 6:
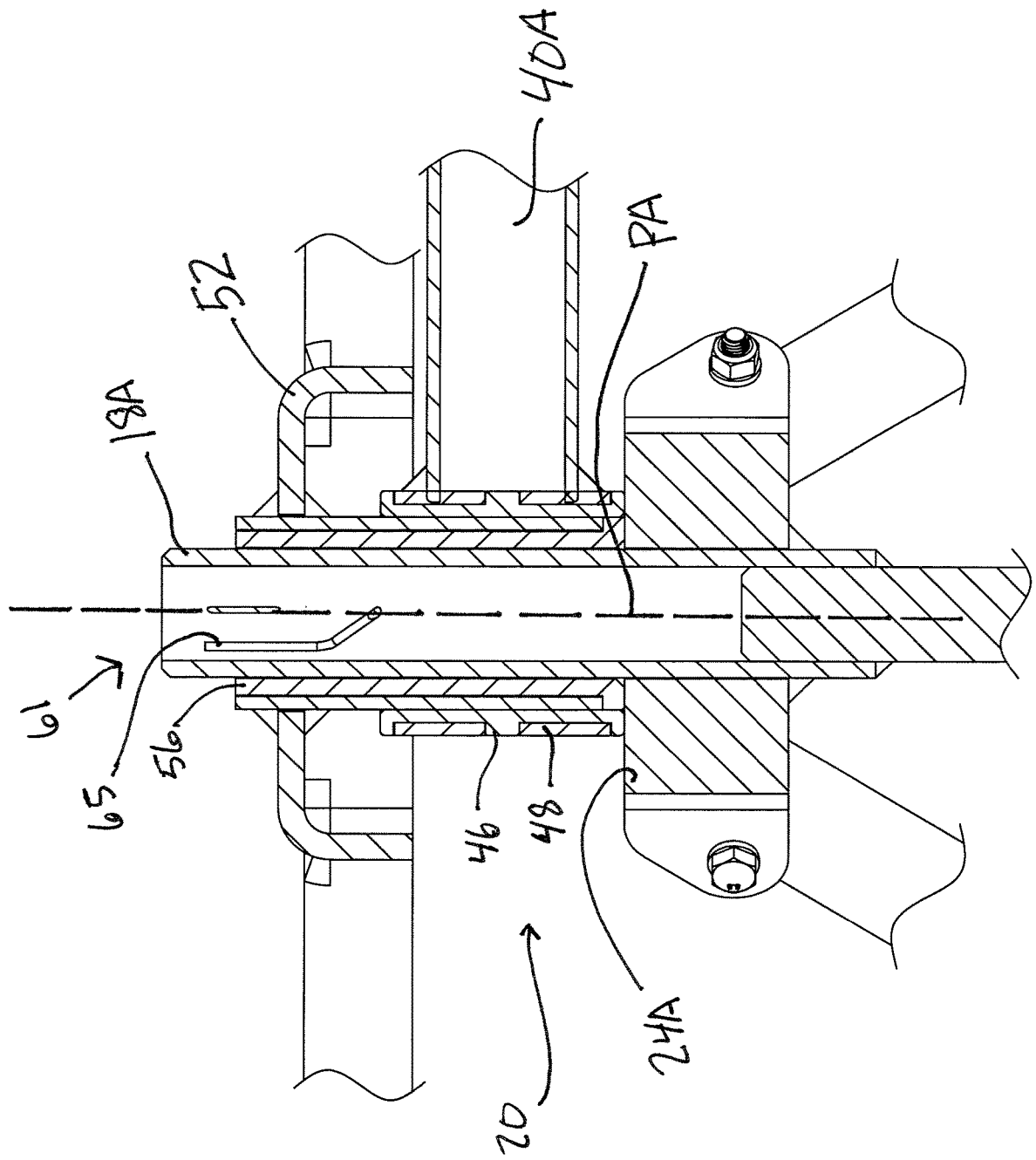
FIG. 6 is a fragmentary cross-section of the connection of the base, seat, and weapon support arm assembly.
Figure 7:
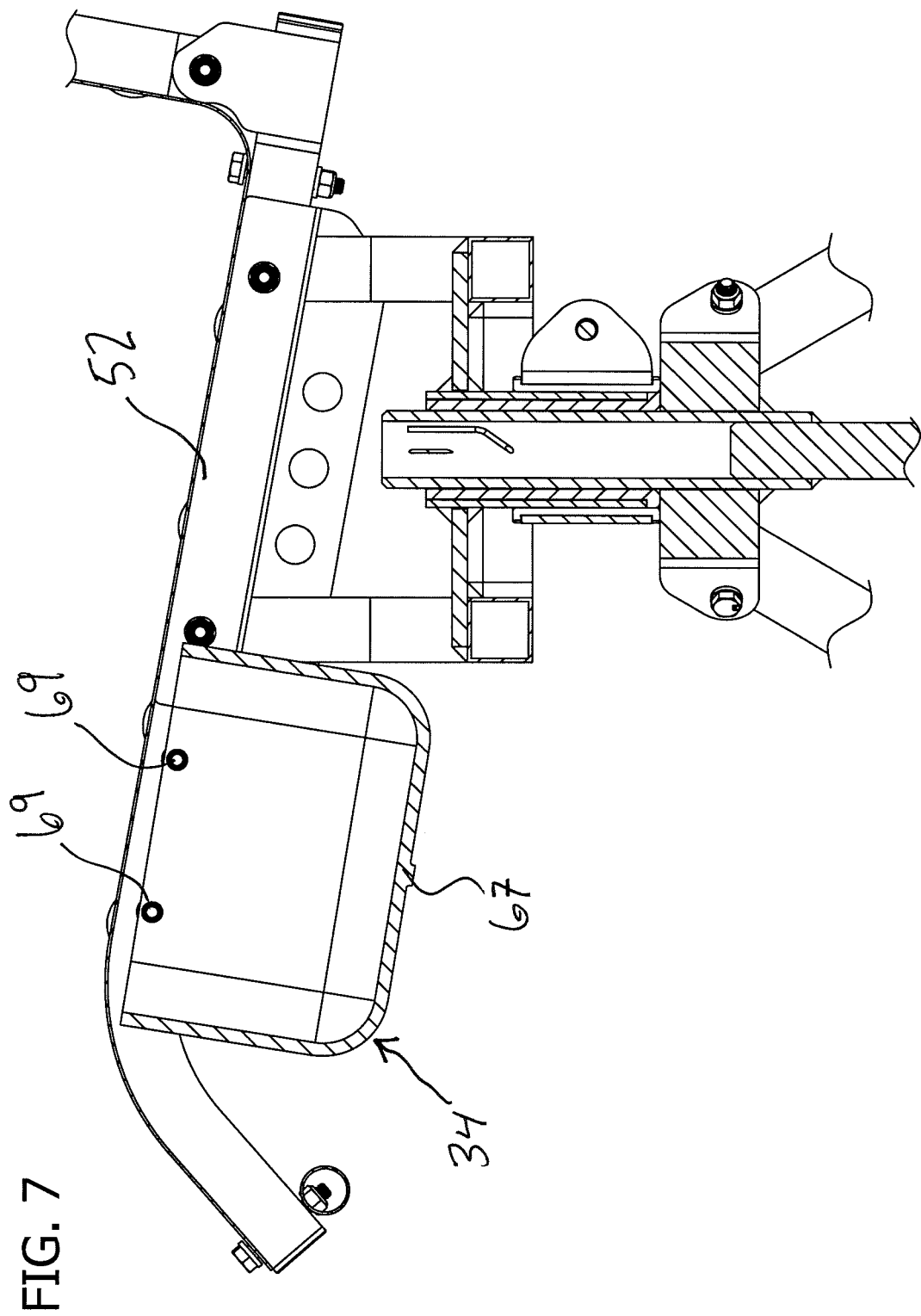
FIG. 7 is a fragmentary cross-section of the base, seat, and weapon support arm assembly.

Referring to FIGS. 5-7, the pivot connector 40C includes a bushing 46 and an adjustable collar 48. The adjustable collar 48 may be welded to the proximal end of the first segment 40A. The bushing 46 is sized and shaped to be received in the collar 48 and engage an inner surface 48A of the collar. The bushing 46 may be made from Delrin or a POM material that snaps into the collar to prevent movement. The collar 48 (e.g., made of metal) includes a slot, a cam lever 41, a fastener 43 (e.g., bolt), and a nut 45 (broadly, "adjusting components.") The cam lever is arranged to reduce a width of the slot when in a closed position (e.g., FIG. 5) and to permit the slot width to increase when in an open position. The nut 45 is threaded onto the fastener 43 such that the cam lever 41 cams against the collar 48 to draw flanges of the collar toward each other to reduce the width of the slot between the flanges. After initially adjusting the nut 45 with a wrench, the cam lever 41 can be used to permit tightening or loosening of the collar 48 without tools. The collar 48 may be tight to prevent pivoting of the weapon support with respect to the seat, or can be loose to permit pivoting of the weapon support with respect to the seat, per the preference of the user. The location of the first pivot connector 40C (at the pivot hub 20) permits the first segment 40A, and thus the weapon support arm assembly 16, to rotate freely about the pivot axis PA.

Referring to FIGS. 1 and 3, the second arm portion 42 is arranged between the first and third arm portions 40, 44. (Only a small portion of the second arm portion 42 is depicted in the FIGS. 1 and 3.) The second arm portion 42 permits the shooter to selectively raise or lower the height of the weapon holder 38. The second arm portion 42 includes a tube having a lower end, an upper end, and a length extending therebetween. The second arm portion 42 is telescopically received in the second segment 40B such that the lower end of the tube remains within the second segment 40B. A retainer 50 (e.g. rotatable friction knob) is connected to the second segment 40B and permits the user to selectively lock the second arm portion 42 to set a distance the second arm portion extends upward out of the second segment 40B. Other ways of adjusting the height of the weapon holder (e.g. a detent, etc.) can be used without departing from the scope of this disclosure.

The third arm portion 44 includes first and second sections 44A, 44B each having respective opposite ends. The first section 44A includes a second pivot connector 44C for connecting the first section 44A to the second arm portion 42. The first section 44A includes a third pivot connector 44D for connecting to the second section 44B. The second section 44B includes a fourth pivot connector 44E for connecting to the weapon holder 38. In the illustrated embodiment, the first and second sections 44A, 44B via the second and third pivot connectors 44C, 44D permit the shooter to selectively adjust the lateral position of the weapon holder 38 with respect to the seat 14.

The weapon holder 38 includes a cradle comprising a bed 51 and opposing jaws 53 for clamping a weapon (e.g. firearm). The weapon holder 38 includes a clamp actuator 55 (e.g., rotatable knob) configured to move the first and second jaws 53 toward and away from each other to clamp and release the weapon. The weapon holder 38 is adjustable (e.g. pivotable about multiple axes) to change an orientation of the weapon with respect to the chair 10. Other types of weapon holders (e.g. without clamping) can be used without departing from the scope of the present disclosure. As will be discussed below, the weapon support arm assembly 16 (e.g., including the weapon holder 38, and arm portions 40, 42, 44) and the seat 14 are independently pivotable with respect to each other such that both can rotate 360 degrees (broadly, at least 180 degrees, or at least 90 degrees) with respect to each other. The weapon support arm assembly 16 can pivot in front of the seat 14 to left or right sides of the seat and can pivot behind the seat.

Referring to FIGS. 3 and 4, the seat 14 includes a seat frame 52 and a seat panel 52A connected thereto. In the illustrated embodiment, a backrest including a backrest frame 54 and a backrest panel 54A is pivotably connected to the seat 14. The backrest is shown in FIG. 3 in a deployed configuration in which it extends upward from the seat 14. It will be appreciated that the backrest is foldable downward toward the seat 14 to a folded configuration. Support straps connect the seat frame 52 to the backrest frame 54 to support the backrest in the deployed configuration. The seat frame 52 includes a seat tube 56 (broadly, "pivot hub connector") for connecting the seat frame 52 to the upper post portion 18A. The seat tube 56 is a hollow tube welded to the frame and sized and shaped for sliding over the upper post portion 18A. As shown in FIG. 6, when the seat tube 56 is received over the upper post portion, the arm connector 40C (including the collar 48 and bushing 46) are received over the seat tube 56, such that both the seat and support arm assembly 16 are pivotably connected to the pivot hub 20. The seat 14, support arm assembly 16, and base 12 can be disassembled by releasing the cam lever 41, and separating the base downward from the seat and support arm assembly, and separating the support arm assembly downward from the seat. A spring detent 61 including a lug 63 (FIG. 4) and a spring 65 (FIG. 6) is provided to prevent inadvertent upward removal of the seat 14 from the base 12, and the lug can be pressed inward by the user to permit removal of the seat tube 56 past the lug.

Referring to FIGS. 7 and 8, the holder 34 is connected to the seat frame 52 for holding the base 12 when the base is in a collapsed configuration. In the illustrated embodiment, the holder 34 includes a container formed of a flexible fabric forming a bag-like enclosure. A zipper 67 may be provided for opening and closing the holder 34. The holder may include grommets 69 (openings) through which fasteners are passed to secure the holder to the frame 52. In other embodiments, the holder may include straps (e.g. Velcro®, button snaps, etc.) fastened to the frame 52 for holding the base 12 to the seat when in the stowed configuration.

It will be understood that the shooting rest chair 10 is configurable to operational and stowed configurations. To configure the shooting rest chair 10 in the operational configuration, the base is configured in its deployed configuration as described above. With the cam lever 41 in its open position, the user places the weapon support arm assembly 16 over the seat tube 56 such that an outer surface of the seat tube engages an inner surface of the bushing 46. The user then places the seat tube 56 over the upper post portion 18A such that the seat and support arm assembly 16 are pivotably connected to the pivot hub 20. As the seat tube 56 is installed over the upper post portion 18A, the user presses the detent 61 (retainer) inward and it resiliently extends outward when the seat tube has passed over the detent. The detent 61 serves to retain the seat 14 on the upper post portion 18A when in the operational configuration. The collar 48 of the weapon support arm assembly 16 is secured using the cam lever 41, such that the collar is permitted to pivot relative to the seat tube or locked relative to the seat tube, depending on the setting of the nut 45 on the fastener 43. To disassemble the shooting rest chair 10 and configure it in the stowed configuration, the user first unlocks the cam latch. The user then presses the detent with the user's finger and lifts the seat 14 up from the upper post portion 18A. Next, the user removes the weapon support arm assembly 16 by lifting it up from the upper post portion 18A. The user then collapses the base 12 to the collapsed configuration as described above and places the collapsed base into the holder 34 under the seat 14.

It will be apparent that modifications and variations are possible without departing from the scope of the invention defined in the appended claims. The dimensions and proportions described herein are by way of example without limitation. Other dimensions and proportions can be used without departing from the scope of the present disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A shooting rest chair for supporting a shooter and a weapon above a support surface, the shooting rest chair comprising:
    a base configured to rest on the support surface, the base being configurable in a deployed configuration and in a collapsed configuration;
    a seat supported by the base, the seat being sized and shaped to support the shooter when the shooter is sitting on the seat; and
    a weapon support arm assembly supported by the base, the weapon support arm assembly being configured to support the weapon, the weapon support arm assembly being pivotable with respect to the seat through a range of motion, the weapon support arm assembly being configured to be selectively fixable at least three different positions along the range of motion to prevent the weapon support arm assembly from pivoting with respect to the seat.

2. The shooting rest chair of claim 1, further comprising a retainer configured to selectively fix the position of the weapon support arm assembly along the range of motion to prevent the weapon support arm assembly from pivoting with respect to the seat.

3. The shooting rest chair of claim 2, wherein the retainer is part of the weapon support arm assembly.

4. The shooting rest chair of claim 2, wherein the retainer comprises a clamp.

5. The shooting rest chair of claim 2, wherein the retainer comprises a cam lever moveable between a locked position where the weapon support arm assembly is held in a fixed position along the range of motion and an unlocked position where the weapon support arm assembly is free to pivot along the range of motion.

6. The shooting rest chair of claim 5, wherein the retainer comprises a collar, the collar being operatively connected to the cam lever such that the collar is tightened when the cam lever is in the locked position and loosened with the cam lever is in the unlocked position.

7. The shooting rest chair of claim 6, further comprising a pivot hub supported by the base, the collar positioned on the pivot hub and configured to rotate about the pivot hub when the cam lever is in the unlocked position and to be fixed in position on the pivot hub when the cam lever is in the locked position.

8. The shooting rest chair of claim 2, wherein the retainer forms a pivot connection about which the weapon support arm assembly pivots along the range of motion.

9. The shooting rest chair of claim 2, wherein the range of motion permits pivoting of the weapon support arm assembly between a left side of the seat and a right side of the seat to change a configuration of the weapon support arm assembly between a left handed shooter arrangement and a right handed shooter arrangement.

10. The shooting rest chair of claim 9, wherein the range of motion extends across a front of the seat to permit pivoting of the weapon support arm assembly between the left side of the seat and the right side of the seat across a front of the seat to change the configuration of the weapon support arm assembly between the left handed shooter arrangement and the right handed shooter arrangement.

11. The shooting rest chair of claim 2, wherein the range of motion about which the weapon support arm assembly is pivotable with respect to the seat comprises at least 90 degrees.

12. The shooting rest chair of claim 2, wherein the range of motion about which the weapon support arm assembly is pivotable with respect to the seat comprises at least 180 degrees.

13. The shooting rest chair of claim 2, wherein the range of motion about which the weapon support arm assembly is pivotable with respect to the seat comprises 360 degrees.

14. The shooting rest chair of claim 2, wherein the weapon support arm assembly is configured to be selectively fixable at any position along the range of motion to prevent the weapon support arm assembly from pivoting with respect to the seat.

15. The shooting rest chair of claim 2, wherein the seat is pivotable with respect to the base, and the weapon support arm assembly is pivotable with respect to the base independent from the seat.

16. The shooting rest chair of claim 2, wherein the base comprises a plurality of legs configured to engage the support surface when the base is in the deployed configuration.

17. The shooting rest chair of claim 2, wherein the weapon support arm assembly includes an arm and a weapon rest, and wherein the arm is configured to extend under the seat and upward to the weapon rest.

18. The shooting rest chair of claim 17, wherein the arm includes a first arm portion, a second arm portion, and a third arm portion, the first arm portion being coupled to the second arm portion by a height adjustment connection and the second arm portion being connected to the third arm portion by a second pivot connection.

19. The shooting rest chair of claim 17, wherein the weapon rest is connected to the arm by a pivot connection.

20. The shooting rest chair of claim 19, wherein the rest comprises a cradle for holding the weapon.

21. The shooting rest chair of claim 1, wherein said at least three different positions along the range of motion are non-predetermined positions along the range of motion.

22. The shooting rest chair of claim 1, wherein in the deployed position the base is arranged to support the shooting rest chair on the support surface and in the collapsed configuration the base is arranged to be stowed.

23. A shooting rest chair for supporting a shooter and a weapon above a support surface, the shooting rest chair comprising:
 a base configured to rest on the support surface;
 a seat supported by the base, the seat being sized and shaped to support the shooter when the shooter is sitting on the seat; and
 a pivot hub supported by the base;
 a weapon support arm assembly supported by the base, the weapon support arm assembly being configured to support the weapon, the weapon support arm assembly being pivotable with respect to the seat about the pivot hub through a range of motion, the weapon support arm assembly being configured to be selectively fixable at at least three different positions along the range of motion to prevent the weapon support arm assembly from pivoting with respect to the seat;
 a retainer configured to selectively fix the position of the weapon support arm assembly along the range of motion to prevent the weapon support arm assembly from pivoting with respect to the seat, the retainer including a first portion and a second portion, the first and second portions configured to move relative to the pivot hub to fix the position of the weapon support arm assembly along the range of motion to prevent the weapon support arm assembly from pivoting with respect to the seat.

24. The shooting rest chair of claim 23, wherein the first and second portions of the retainer are configured to engage the pivot hub in an arrangement where the first portion and second portion engage opposing sides of the pivot hub to fix the position of the weapon support arm assembly along the range of motion.

25. The shooting rest chair of claim 24, wherein the pivot hub is a pivot hub connector of the seat, the pivot hub connector pivotably coupling the seat to the base to permit the seat to pivot relative to the base.

26. The shooting rest chair of claim 24, wherein the first and second portions of the retainer are configured to be drawn toward the pivot hub to constrict the pivot hub between the first and second portions to fix the position of the weapon support arm assembly along the range of motion.

27. The shooting rest chair of claim 23, wherein the first and second portions of the retainer bound an opening sized and shaped to receive the seat, the first and second portions being configured to move relative to each other to decrease a size of the opening to fix the position of the weapon support arm assembly along the range of motion and to increase the size of the opening to permit the weapon support arm assembly to move along the range of motion.

28. The shooting rest chair of claim 23, wherein the retainer includes an actuator configured to configure the first and second portions of the retainer relative to each other to fix the position of the weapon support arm assembly along the range of motion.

29. The shooting rest chair of claim 28, wherein the actuator is moveable between a locked position where the weapon support arm assembly is held in a fixed position along the range of motion by the first and second portions of the retainer and an unlocked position where the weapon support arm assembly is free to pivot along the range of motion.

30. The shooting rest chair of claim 29, wherein the actuator comprises a cam lever.

31. The shooting rest chair of claim 28, wherein the retainer comprises a collar, the actuator being configured to tighten the collar to configure the first and second portions to fix the position of the weapon support arm assembly along the range of motion and to loosen the collar to permit the weapon support arm assembly to move along the range of motion.

32. The shooting rest chair of claim 31, wherein the actuator comprises a cam lever.

33. The shooting rest chair of claim 31, wherein the collar is supported by the pivot hub and configured to rotate about the pivot hub when the collar is loosened and to be fixed in position with respect to the pivot hub when the collar is tightened to fix the position of the weapon support arm assembly.

34. The shooting rest chair of claim 31, wherein the first and second portions are coupled to and inhibited from moving relative to the collar.

35. The shooting rest chair of claim 31, wherein the first and second portions are snapped into the collar.

36. The shooting rest chair of claim 23, wherein the retainer comprises a collar, the collar being configurable to tighten the collar to configure the first and second portions to fix the position of the weapon support arm assembly along the range of motion, and the collar being configurable to loosen the collar to permit the weapon support arm assembly to move along the range of motion.

\* \* \* \* \*